(12) United States Patent
Nishida

(10) Patent No.: US 8,402,090 B2
(45) Date of Patent: Mar. 19, 2013

(54) TELECONFERENCING APPARATUS, TELECONFERENCING SYSTEM, METHOD OF CONTROLLING TELECONFERENCING APPARATUS, AND COMPUTER-READABLE MEDIUM STORING CONTROL PROGRAM FOR CONTROLLING TELECONFERENCING APPARATUS

(75) Inventor: Makoto Nishida, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 485 days.

(21) Appl. No.: 12/659,227

(22) Filed: Mar. 1, 2010

(65) Prior Publication Data
US 2010/0229104 A1    Sep. 9, 2010

(30) Foreign Application Priority Data

Mar. 9, 2009  (JP) ................................. 2009-054630

(51) Int. Cl.
*G06F 15/16* (2006.01)
(52) U.S. Cl. .................... 709/204; 715/753; 379/202.01
(58) Field of Classification Search .................. 709/204; 715/753; 379/202.01
See application file for complete search history.

(56) References Cited

U.S. PATENT DOCUMENTS

| | | | |
|---|---|---|---|
| 5,996,003 A | 11/1999 | Namikata et al. | |
| 6,298,129 B1* | 10/2001 | Culver et al. | 379/202.01 |
| 7,162,696 B2* | 1/2007 | Wakefield | 715/716 |
| 2001/0016038 A1* | 8/2001 | Sammon et al. | 379/202.01 |
| 2002/0091769 A1* | 7/2002 | Drozdzewicz et al. | 709/204 |
| 2003/0118167 A1* | 6/2003 | Sammon et al. | 379/202.01 |
| 2003/0235277 A1* | 12/2003 | Fuller et al. | 379/88.13 |
| 2007/0133774 A1* | 6/2007 | Fujimoto | 379/202.01 |
| 2008/0184115 A1* | 7/2008 | Back et al. | 715/702 |

FOREIGN PATENT DOCUMENTS

JP   A-9-101767   4/1997

* cited by examiner

*Primary Examiner* — Thomas Dailey
(74) *Attorney, Agent, or Firm* — Oliff & Berridge, PLC

(57) ABSTRACT

A teleconferencing apparatus for a teleconference to be performed between a plurality of terminal apparatus including a shared display area and an individual display area, the teleconferencing apparatus includes a browsing page information storage control device that causes a browsing page information storage device to store, identification information for identifying the terminal apparatus having sent the page information and the received page information, a browsing time information storage device that stores, as browsing time information, the page information of the display data displayed in the individual display area and a display time indicating a time in which a page specified with the page information is displayed in the individual display area unlike a page in the shared display area, a sending device that sends page information of the browsing time information, to the terminal apparatus.

8 Claims, 19 Drawing Sheets

FIG. 4

BROWSING PAGE TABLE 1100

| | 13:00:00 | 13:00:01 | 13:00:02 | ... | 13:05:00 | 13:05:01 | 13:05:02 | ... | 13:10:00 | 13:10:01 |
|---|---|---|---|---|---|---|---|---|---|---|
| TERMINAL A | 1 | 1 | 1 | ... | 3 | 3 | 3 | ... | 5 | 5 |
| TERMINAL B | 1 | 1 | 1 | ... | 2 | 2 | 2 | ... | 5 | 5 |
| TERMINAL C | 1 | 1 | 1 | ... | 2 | 2 | 2 | ... | 5 | 5 |
| TERMINAL D | 1 | 1 | 1 | ... | 3 | 3 | 3 | ... | 2 | 2 |
| TERMINAL E | 1 | 1 | 1 | ... | 3 | 3 | 3 | ... | 2 | 2 |

BROWSING TIME SUM TABLE

| PAGE NUMBER | TERMINAL A | TERMINAL B | TERMINAL C | TERMINAL D | TERMINAL E |
|---|---|---|---|---|---|
| 1 | 0 | 0 | 0 | 0 | 0 |
| 2 | 0 | 30 | 20 | 0 | 0 |
| 3 | 0 | 35 | 30 | 0 | 0 |
| 4 | 0 | 15 | 0 | 20 | 30 |
| 5 | 0 | 10 | 0 | 0 | 0 |

1300

| PRIORITY TABLE | | |
|---|---|---|
| PRIORITY | SPECIFIED BASE TERMINAL | SPECIFIED BROWSING TIME |
| 1 | TERMINAL B | 35 |
| 2 | TERMINAL D | 20 |

TELECONFERENCING APPARATUS, TELECONFERENCING SYSTEM, METHOD OF CONTROLLING TELECONFERENCING APPARATUS, AND COMPUTER-READABLE MEDIUM STORING CONTROL PROGRAM FOR CONTROLLING TELECONFERENCING APPARATUS

CROSS-REFERENCE TO RELATED APPLICATION

This Application claims priority from JP2009-054630, filed on Mar. 9, 2009, the content of which is hereby incorporated by reference.

BACKGROUND

This disclosure relates to a teleconferencing apparatus, a teleconferencing system, a method of controlling a teleconferencing apparatus, and a computer-readable medium storing a control program for controlling a teleconferencing apparatus. More specifically, this disclosure relates to a teleconferencing apparatus, a teleconferencing system, a method of controlling a teleconferencing apparatus, and a computer-readable medium storing a control program for controlling a teleconferencing apparatus, capable of easily determining a page necessary for re-explanation.

Conventionally, according to a well-known conferencing system, a plurality of remote communication terminals are connected to one single teleconferencing system so as to realize a conference as if the conference were being held in the same place. In the above-described teleconferencing system, conference materials in the form of an electronic file are sent to each of base terminals so as to be displayed thereon. When the explainer distributes the materials to the listeners in order to give an explanation, the base terminal of the explainer receives a page number of the distributed materials which are being browsed by the listener from the base terminal of the listener, and displays a list of pages being browsed by the listener. As a result, the explainer can know the conditions that the listener browses the materials. When the page explained by the explainer does not coincide with the page browsed by the listener, the explainer determines that the listener does not understand the page currently browsed by the listener, and explains the page again. As a result, the conference can efficiently proceed.

SUMMARY

However, the above-described conferencing system has a problem. In particular, as the number of base terminals of the listener increase, it is difficult for the explainer who explains the distributed materials to know the contents of a page being browsed in the form of a list, and further to determine any page necessary for re-explanation.

This disclosure has been made in consideration of the above-described problem. An object of the disclosure is to provide a teleconferencing apparatus, a teleconferencing system, a method of controlling a teleconferencing apparatus, and a computer-readable medium storing program for controlling a teleconferencing apparatus, capable of easily determining a page necessary for re-explanation.

To solve the problem described above, in a first aspect of this disclosure, a teleconferencing apparatus for controlling a teleconference to be performed between a plurality of terminal apparatus each including, in a display area of its display device, a shared display area for sharing and displaying a page of display data via a network and an individual display area for displaying the page of the display data which is changeable by a user, the teleconferencing apparatus includes a page information reception determination device that determines whether page information as information for identifying the page of the display data being displayed in the individual display area has been received; a browsing page information storage control device that, when the page information reception determination device determines that the page information has been received, causes a browsing page information storage device to store, as browsing page information, identification information for identifying at least one of the plurality of terminal apparatus having sent the page information and the received page information, in association with each other; a browsing time information storage device that stores, as browsing time information, the page information of the display data displayed in the individual display area and a display time indicating a time in which a page specified with the page information is displayed in the individual display area unlike a page being displayed in the shared display area, in association with each other for each pieces of the identification information; a page information determination device that determines whether there exists the browsing time information satisfying a predetermined criterion for sending the page information to the at least one of the plurality of terminal apparatus, of the browsing time information stored in the browsing time information storage device; and a sending device that, when the page information determination device determines that there exists the page information satisfying the predetermined criterion, sends message data indicating that the page specified with the page information is displayed on the at least one of the plurality of terminal apparatus and page information of the browsing time information satisfying the predetermined criterion, to the at least one of the plurality of terminal apparatus connected to the teleconference.

To solve the problem described above, in a second aspect of this disclosure, a teleconferencing system includes a teleconferencing apparatus that controls a teleconference performed to be performed between a plurality of terminal apparatus each including, in a display area of its display device, a shared display area for sharing and displaying a page of display data via a network and an individual display area for displaying the page of the display data which is changeable by a user, the teleconferencing apparatus including: a page information reception determination device that determines whether page information as information for identifying the page of the display data being displayed in the individual display area has been received; a browsing page information storage control device that, when the page information reception determination device determines that the page information has been received, causes a browsing page information storage device to store, as browsing page information, identification information for identifying at least one of the plurality of terminal apparatus having sent the page information and the received page information, in association with each other; a browsing time information storage device that stores, as browsing time information, the page information of the display data displayed in the individual display area and a display time indicating a time in which a page specified with the page information is displayed in the individual display area unlike a page being displayed in the shared display area, in association with each other for each piece of the identification information; a page information determination device that determines whether there exists the browsing time information satisfying a predetermined criterion for sending the page information to the at least one of the plurality of terminal apparatus, of the browsing time information stored in the browsing time information storage device; and a sending device that, when the page information determination device determines that there exists the page information satisfying the predetermined criterion, sends message data indicating that the page specified with the page information is displayed on the at least one of the plurality of terminal apparatus and page information of the browsing time information satisfying the predetermined criterion, to the at least one of the plurality of terminal apparatus connected to the teleconference, and each of the plurality of terminal apparatus including: an instruction device that instructs to change a page of the display data being displayed in the individual display area of the display device; a page change determination device that determines whether the page of the display data being displayed in the individual display area of the display device has been changed to another page by the instruction device; an elapsed time determination device that determines whether a fifth predetermined time has elapsed, after the page change determination device determines that the page of the display data has been changed to another page; a page information sending device that, when the elapsed time determination device determines that the fifth predetermined time has elapsed, sends to the teleconferencing apparatus the page information of the display data being displayed in the individual display area of the display device; a reception determination device that determines whether the message data sent by the sending device of the teleconferencing apparatus and the page information have been received; a first display control device that, when the reception determination device has determined that the message data and the page information have been received, causes the display area of the display device to display the received message data; and a second display control device that causes the shared display area of the display device to display a page of the display data specified with the received page information, after a sixth predetermined time has elapsed, since the message data has been displayed in the display area of the display device by the first display control device.

To solve the problem described above, in a third aspect of this disclosure, a method of controlling a teleconferencing apparatus which controls a teleconference to be performed between a plurality of terminal apparatus each including, in a display area of its display device, a shared display area for sharing and displaying a page of display data via a network and an individual display area for displaying the page of the display data which is changeable by a user, the method includes a page information reception determination step of determining whether page information as information for identifying the page of the display data being displayed in the individual display area has been received; a browsing page information storage control step of, when it is determined in the page information reception determination step that the page information has been received, storing identification information for identifying at least one of the plurality of terminal apparatus having sent the page information and the received page information, in association with each other as browsing page information; a browsing time information storage step of storing, as browsing time information, the page information of the display data displayed in the individual display area and a display time indicating a time in which a page specified with the page information is displayed in the individual display area unlike a page being displayed in the shared display area, in association with each other for each piece of the identification information; a page information determination step of determining whether there exists the browsing time information satisfying a predetermined criterion for sending the page information to the at least one of the plurality of terminal apparatus, of the browsing time information stored in the browsing time information storage step; and a sending step of, when it is determined in the page information determination step that there exists the page information satisfying the predetermined criterion, sending message data indicating that the page specified with the page information is displayed on the at least one of the plurality of terminal apparatus and page information of the browsing time information satisfying the predetermined criterion, to the at least one of the plurality of terminal apparatus connected to the teleconference.

To solve the problem described above, in a fourth aspect of this disclosure, a computer-readable medium storing a control program for controlling a teleconferencing apparatus which controls a teleconference to be performed between a plurality of terminal apparatus each including, in a display area of its display device, a shared display area for sharing and displaying a page of display data via a network and an individual display area for displaying the page of the display data which is changeable by a user, the control program including instructions for executing a method to be executed by a computer of the teleconferencing apparatus, the method includes a page information reception determination step of determining whether page information as information for identifying the page of the display data being displayed in the individual display area has been received; a browsing page information storage control step of, when is determined in the page information reception determination step that the page information has been received, storing identification information for identifying at least one of the plurality of terminal apparatus having sent the page information and the received page information, in association with each other as browsing page information; a browsing time information storage step of storing, as browsing time information, the page information of the display data displayed in the individual display area and a display time indicating a time in which a page specified with the page information is displayed in the individual display area unlike a page being displayed in the shared display area, in association with each other for each piece of the identification information; a page information determination step of determining whether there exists the browsing time information satisfying a predetermined criterion for sending the page information to the at least one of the plurality of terminal apparatus, of the browsing time information stored in the browsing time information storage step; and a sending step of, when it is determined in the page information determination step that there exists the page information satisfying the predetermined criterion, sending message data indicating that the page specified with the page information is displayed on the at least one of the plurality of terminal apparatus and page information of the browsing time information satisfying the predetermined criterion, to the at least one of the plurality of terminal apparatus connected to the teleconference.

BRIEF DESCRIPTION OF THE DRAWINGS

Exemplary embodiments of the invention will be described below in detail with reference to the accompanying drawings in which:

FIG. 4 is a schematic diagram showing a configuration of a browsing page table;

FIG. 5 is a schematic diagram showing a configuration of a browsing time sum table;

DETAILED DESCRIPTION OF THE EXEMPLARY EMBODIMENTS

Descriptions will now be made of a teleconferencing system 1 according to one embodiment of this disclosure with reference to the accompanying drawings. The teleconferencing system 1 will schematically be described with reference to FIG. 1.

Figure 1:
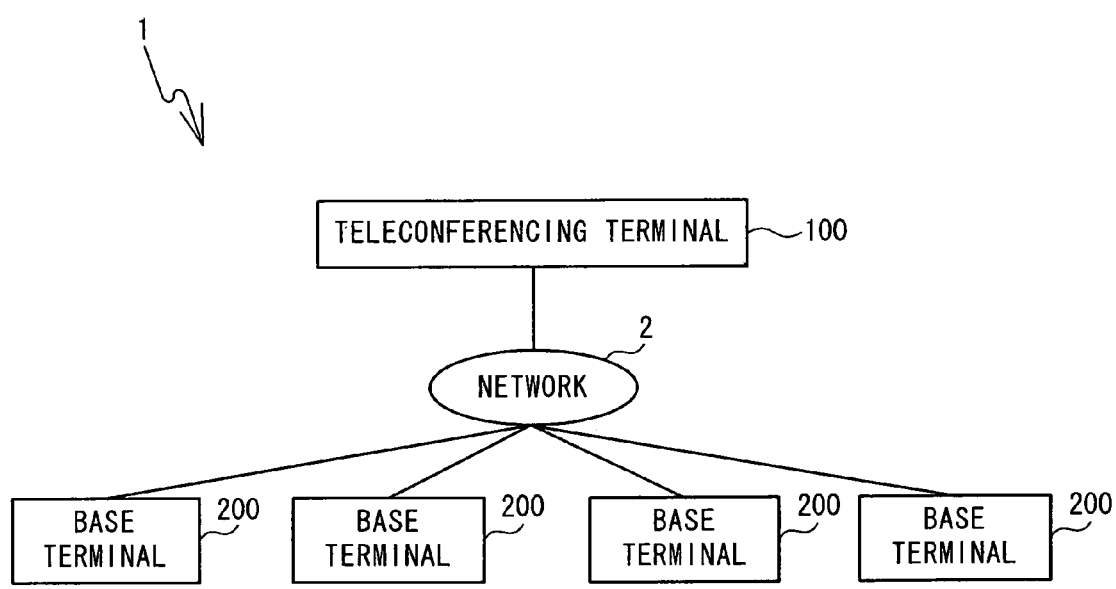
FIG. 1 is a diagram showing an example of a topology of a teleconferencing system.

A plurality of base terminals 200 are connected to a teleconferencing terminal 100 via a network 2. The teleconferencing terminal 100 is, for example, a well-known personal computer, and is a general-purpose unit. Teleconference can be achieved by a plurality of base terminals 200 connected to the conferencing terminal 100, by sending and receiving image data and voice data. FIG. 1 shows four base terminals 200. However, in fact, at least two or more base terminals 200 are necessary, as long as teleconference can be achieved via the network 2. A plurality of base terminals 200 may be provided in the same site of, for example, a company. The base terminals 200 may be provided throughout different offices, regions or countries. In this embodiment, of the plurality of base terminals 200, a certain base terminal 200 serves as a "base station 200 of an explainer". This base terminal 200 is one that has firstly sent data shared in the teleconferencing system 1 to the teleconferencing terminal 100. The base terminals 200 other than the base terminal 200 of the explainer serve as "base terminals 200 of the auditors". These base terminals 200 receive the explanation from a user using the base terminal 200 of the explainer.

The base terminals 200 are, for example, well-known personal computers, and general-purpose units. Each of the base terminals 200 includes a camera 250 (see FIG. 6), a microphone 240 (see FIG. 6), a monitor 270 (see FIG. 6) and a speaker 260 (see FIG. 6). The camera 250 externally inputs an image to be used in the teleconference. The microphone 240 externally inputs voice. The monitor 270 externally outputs an image. The speaker 260 externally outputs voice. The base terminal 200 of the explainer has the same hardware architecture as that of the base terminals 200 of the auditors.

Figure 2:
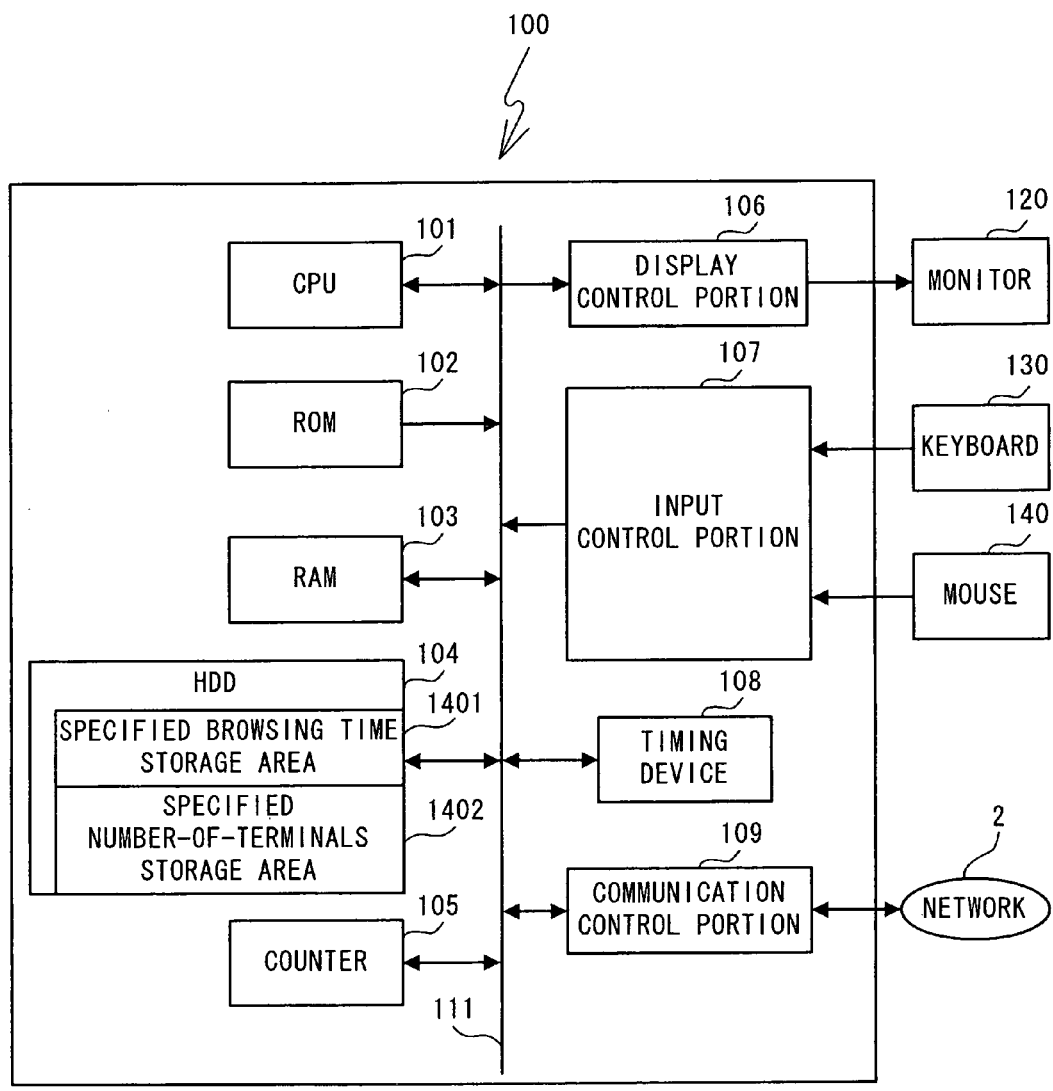
FIG. 2 is a block diagram showing an electrical configuration of a teleconferencing terminal.

An electrical configuration of the teleconferencing terminal 100 will now be described with reference to the block diagram of FIG. 2. The teleconferencing terminal 100 includes a CPU 101 that controls the teleconferencing terminal 100. The CPU 101 is connected to a ROM 102, a RAM 103, a Hard Disk Drive (HDD) 104, a counter 105, a display control portion 106, an input control portion 107, a timing device 108 and a communication control portion 109, via a bus 111.

The ROM 102 stores a program(s) and a set value for operating the BIOS executed by the CPU 101. The RAM 103 temporarily stores various data. The HDD 104 includes a specified browsing time storage area 1401 and a specified number-of-terminals storage area 1402. The specified browsing time storage area 1401 stores the specified time (hereinafter referred to as "specified browsing time") for page data displayed on the base terminal 200 of the auditor. The specified browsing time is used as the determination criterion for determining a page for re-explanation, in a re-explanation determination process (see FIG. 9). The specified number-of-terminals storage area 1402 stores the number of base terminals 200 of the auditors (hereinafter, referred to as "specified number of terminals"). The specified number of terminals is used as the determination criterion for determining a page for re-explanation, in the re-explanation determination process (see FIG. 9). The HDD 104 stores various programs executed by the teleconferencing terminal 100. The counter 105 functions as a timer, and measures the time.

The display control portion 106 is connected to the monitor 120 for displaying an operation terminal screen, and controls display on the monitor 120. The input control portion 107 is connected to a keyboard 130 and/or a mouse 140 for input in accordance with user operation, and controls the input. The timing device 108 clocks the time, as an internal clock. The communication control portion 109 controls to send and receive data to and from an external apparatus, such as the base terminal 200, via the network 2.

Figure 3:
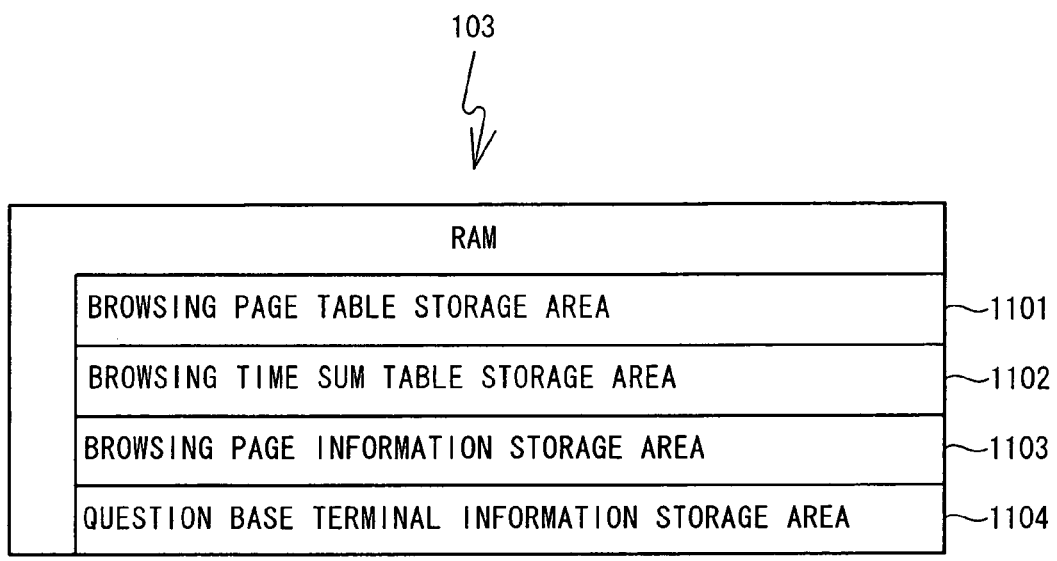
FIG. 3 is a schematic diagram showing a configuration of a storage area in a RAM of the teleconferencing terminal.

The RAM 103 will now specifically be described with reference to FIG. 3. The RAM 103 includes a browsing page table storage area 1101, a browsing time sum table storage area 1102, a browsing page information storage area 1103 and a question base terminal information storage area 1104.

The browsing page table storage area 1101 stores a browsing page table 1100 (see FIG. 4). The browsing page table 1100 will specifically be described later. The browsing time sum table storage area 1102 stores a browsing time sum table 1200 (see FIG. 5). The browsing time sum table 1200 will specifically be described later. The browsing page information storage area 1103 stores browsing page information. The browsing page information includes terminal IDs and information for specifying page data (hereinafter referred to as "page number"), in association with each other. The terminal ID is information for identifying the base station 200. The page data is data regarding a page displayed on the base terminal 200. The question base terminal information storage area 1104 stores a terminal ID acquired from the browsing time sum table 1200, as a question base terminal, in the re-explanation determination process (see FIG. 9). The browsing time sum table storage area 1102, the browsing page information storage area 1103 and the question base terminal information storage area 1104 are shared memory areas in which information can be shared among different processings.

The browsing page table 1100 will now specifically be described with reference to FIG. 4. The browsing page table 1100 stores page numbers of page data displayed on each of the base terminals 200 at each predetermined time period. In other words, the terminal IDs, the predetermined time periods and the page numbers displayed at the predetermined periods are stored in association with each other. In this embodiment, the terminal ID corresponds to a MAC address sent from the base terminal 200. The predetermined time period is one second. In the example of FIG. 4, the base terminal 200 specified as "terminal A" displays page data specified with a page number "3" at a time period from "13:05:00" to "13:05:01". Every time the predetermined time period (one second) elapses, the page number displayed on each base terminal 200 is newly added to the browsing page table 1100.

The browsing time sum table 1200 will specifically be described with reference to FIG. 5. The browsing time sum table 1200 stores the display sum time. The display sum time indicates the sum of time (seconds) during which page data is displayed. In particular, this page data is different from the page data displayed on the base terminal 200 of the explainer. That is, the terminal IDs of the base terminals 200, the page numbers of the displayed page data and the display sum times are stored in association with each other. In the example of FIG. 5, for the base terminal 200 specified as "terminal B", the display sum time for the page data corresponding to page number "1" is "0" second, while the display sum time for the page data corresponding to page number "2" is "30" seconds.

Figure 6:
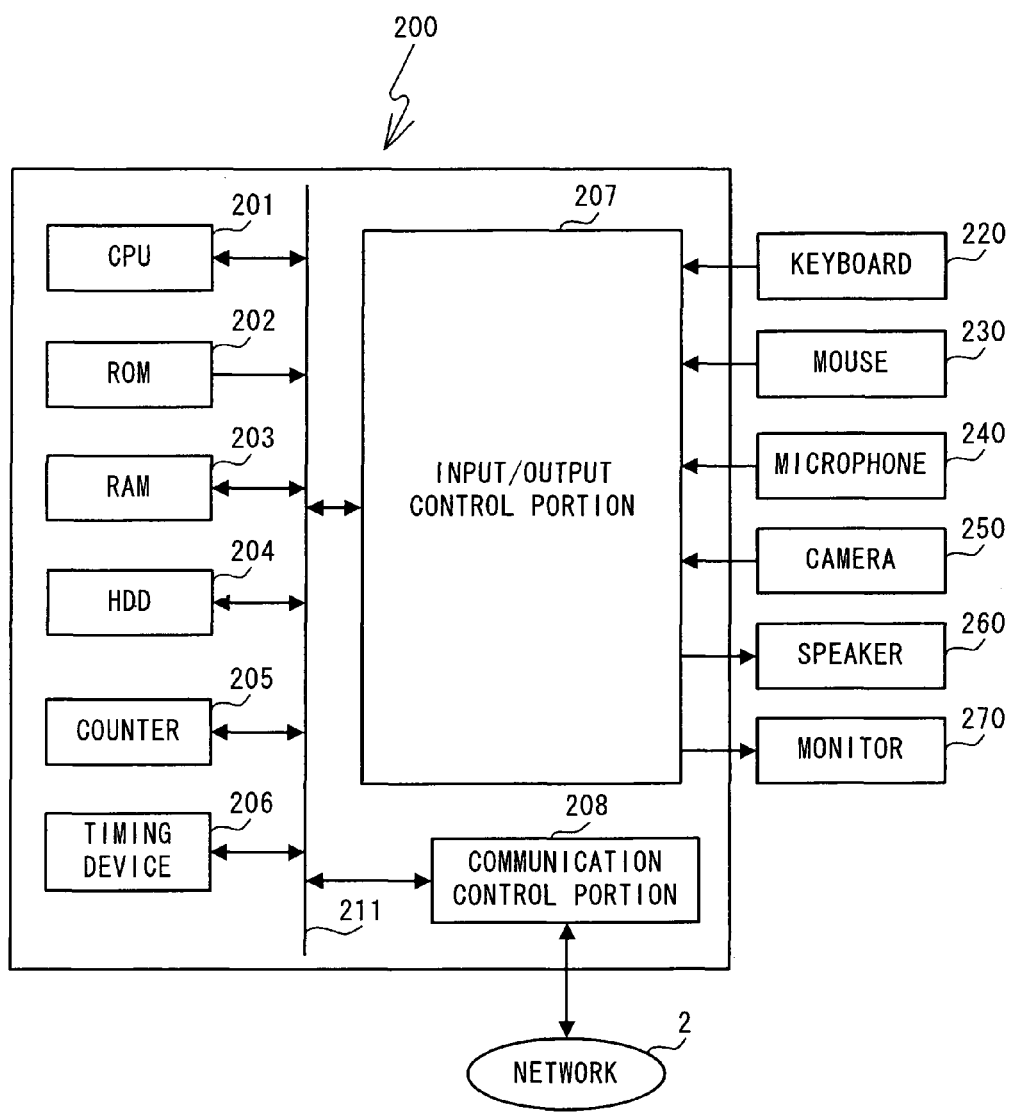
FIG. 6 is a block diagram showing an electrical configuration of a base terminal.

The electrical configuration of the base terminal 200 will now specifically be described with reference to the block diagram of FIG. 6. The base terminal 200 includes a CPU 201 which controls the base terminal 200. The CPU 201 is connected to a ROM 202, a RAM 203, a Hard Disk Drive (HDD) 204, a counter 205, a timing device 206, an input/output control portion 207 and a communication control portion 208, via a bus 211.

The ROM 202 stores programs or set values for the BIOS executed by the CPU 201. The RAM 203 temporarily stores various data. The HDD 204 stores various programs executed by the base terminal 200. The counter 205 functions as a timer, and measures the time. The timing device 206 clocks the time as an internal clock.

The input/output control portion 207 is connected to a keyboard 220, a mouse 230, a microphone 240, a camera 250, a speaker 260 and a monitor 270. The keyboard 220 and the mouse 230 are used for input in accordance with user operation. The microphone 240 acquires voice data for use in the teleconference from the user. The camera 250 acquires image data for use in the teleconference from the user. The speaker 260 outputs voice data sent from the teleconferencing terminal 100 during performance of the teleconference. The monitor 270 displays image data sent from the teleconferencing terminal 100. The communication control portion 208 controls to send and receive data to and from an external apparatus, such as the teleconferencing terminal 100, via the network 2.

Figure 7:
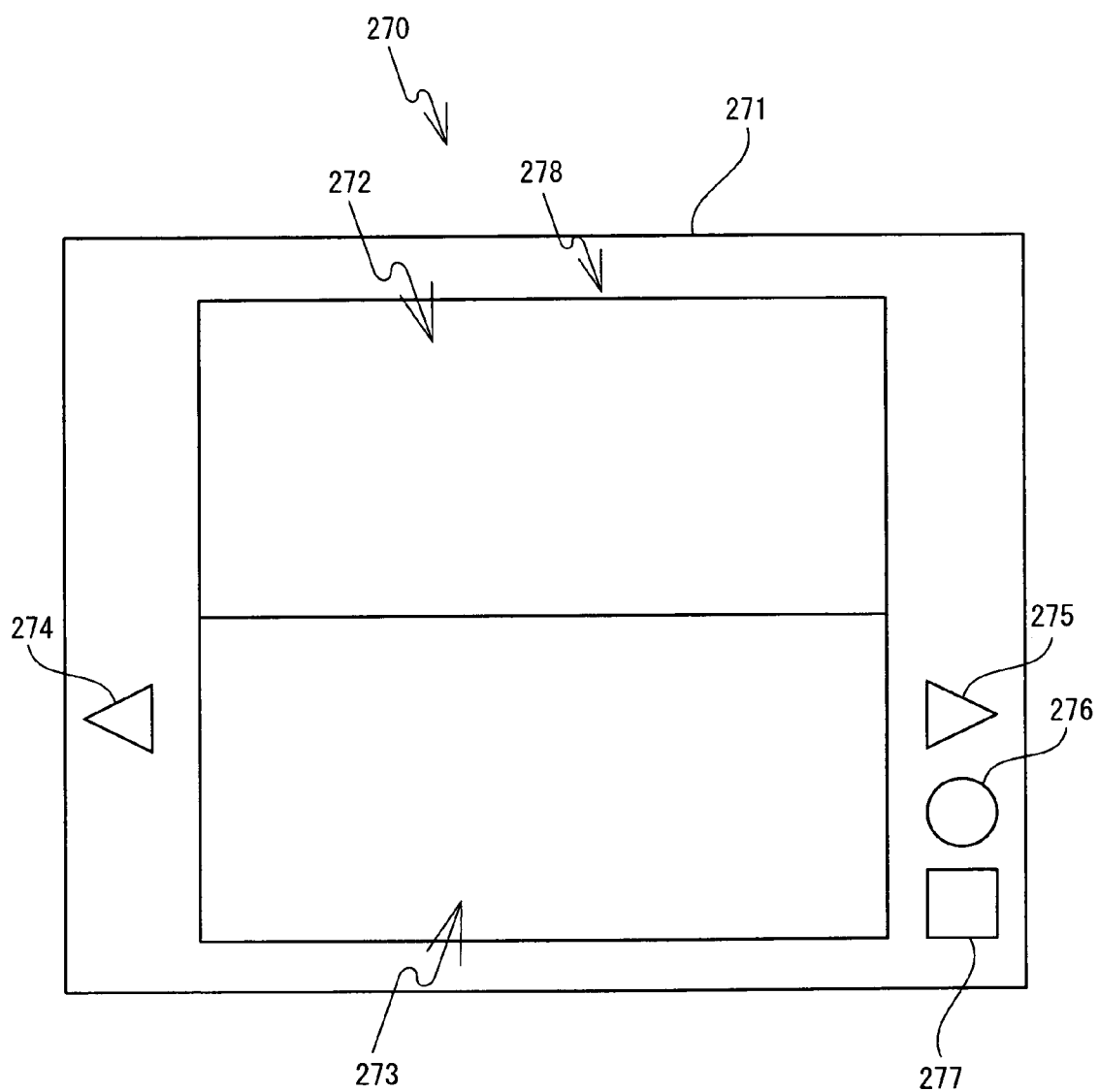
FIG. 7 is a diagram showing one concrete example of a teleconferencing terminal screen displayed on a monitor of the base terminal.

A teleconferencing terminal screen 271 displayed on the monitor 270 of the base terminal 200 will now specifically be described with reference to FIG. 7. In FIG. 7, the upper side of the document paper is referred to as "upper side" of the teleconferencing terminal screen 271, the lower side of the document paper is referred to as "lower side" of the teleconferencing terminal screen 271, the left side of the document paper is referred to as "left side" of the teleconferencing terminal screen 271, and the right side of the document paper is referred to as "right side" of the teleconferencing terminal screen 271.

The teleconferencing terminal screen 271 is displayed on the monitor 270 of each base terminal 200, when teleconference is performed. The teleconferencing terminal screen 271 has a substantially rectangle shape in a plan view. The teleconferencing terminal screen 271 includes a display area 278, which displays data for use in the teleconferencing and has a rectangle shape in a plan view. The display area 278 of the base terminal 200 of the auditor has a shared display area 272 in its upper side half and an individual display area 273 in the lower side half. The display area 278 includes a previous page display button 274 on the left side thereof. The display area 278 includes a next page display button 275, an explanation page shifting button 276 and an acknowledgment button 277 on the right side thereof.

The shared display area 272 of the base terminal 200 of the auditor displays page data which is displayed on the base terminal 200 of the explainer in the teleconferencing. This page data is sent to each base terminal 200 of the auditor that is connected for teleconference, through the teleconferencing terminal 100. The individual display area 273 displays data displayed on the base terminal 200 of the explainer, as well. In this case, the auditor can make a change to the page data which is currently displayed. The base terminal 200 of the explainer includes neither the shared display area 272 nor the individual display area 273, and includes only the display area 278.

The previous page display button 274 is used for shifting from the currently-displayed page data to the previous page data. On the base terminal 200 of the explainer, when the previous page display button 274 is pressed, the terminal displays previous page data of the page data being displayed on the display area 278. On the base terminal 200 of the auditor, when the previous page display button 274 is pressed, the terminal displays previous page data of the page data being displayed in the individual display area 273.

The next page display button 275 is used for shifting from the currently displayed page data to the next page data. On the base terminal 200 of the explainer, when the next page display button 275 is pressed, the terminal displays next page data of the page data being displayed in the display area 278. On the base terminal 200 of the auditor, when the next page display button 275 is pressed, the terminal displays next page data of the page data being displayed in the individual display area 273.

The explanation page shifting button 276 is used for immediately shifting from page data being displayed in the individual display area 273 to page data being displayed on the base terminal 200 of the explainer.

The acknowledgement button 277 is used when the user, who has received re-explanation about page data from the explainer, acknowledges the contents of the re-explanation.

Figure 8:
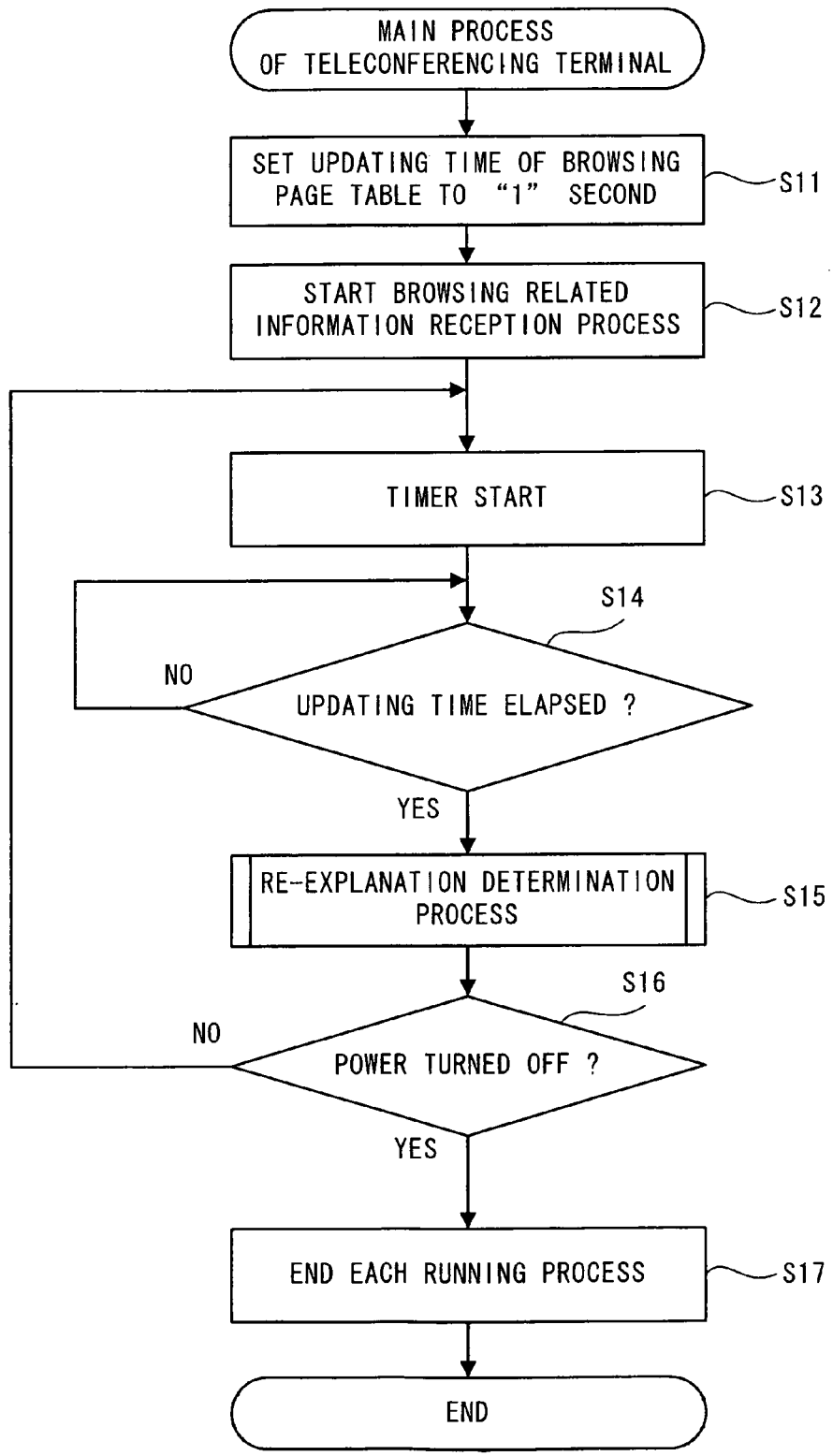
FIG. 8 is a flowchart of a main process executed by the teleconferencing terminal.

A main process executed by the teleconferencing terminal 100 will now specifically be described with reference to FIG. 8. The main process of the teleconferencing terminal 100 is executed, when the teleconferencing terminal 100 is turned ON.

When the main process of the teleconferencing terminal 100 is executed, the time intervals (updating time) for updating the browsing page table 1100 are set (S11). In this embodiment, the browsing page table 1100 is updated once every second, so the updating time is set to "1". This updating time is stored in the RAM 103. The browsing related information reception process (see FIG. 10) is started (S12). At this time, another process different from the main process is generated, and the browsing related information reception process operates. The main process operates as parent process, while the browsing related information reception process started from the main process operates as child process. This browsing related information reception process will specifically be described later. Data transmission between the main process (parent process) and the browsing related information reception process (child process) is performed using the shared memory area of the RAM 103.

Subsequently, the timer starts counting (S13). The counting measurement processing is performed with a first counter as a timer counter. The measurement begins, after the first counter is initialized to "0". The first counter counts up based on a signal from the timing device 108 connected to the CPU 101.

It is determined whether the updating time has elapsed (S14). This determination processing is made based on whether the value of the first counter has exceeded the updating time stored in the RAM 103. When it is determined that the updating time has not elapsed (S14: NO), that is, when the value of the first counter has not elapsed one second (the updating time stored in the RAM 103), the determination processing of S14 is performed again. In other words, the determination processing of S14 is repeatedly executed until the value of the first counter exceeds one second.

When it is determined that the updating time has elapsed (S14: YES), that is, when the value of the first counter has exceeded one second (the updating time stored in the RAM 103), the re-explanation determination process is performed (S15). This re-explanation determination process will specifically be described later.

Then, it is determined whether the teleconferencing terminal 100 is turned OFF (S16). This determination processing is made based on whether a power button (not illustrated) has been pressed by the user who uses the teleconferencing terminal 100. When it is determined that the terminal is turned OFF (S16: YES), that is, when the power button has been pressed by the user, each process started from the main process is forced to end (S17). At this time, a signal for forcibly stopping the browsing related information reception process started in S12 is sent. Then, the main process ends.

When it is determined that the teleconference terminal 100 is not turned OFF (S16: NO), that is, when the power button is not pressed by the user, the processing proceeds to S13, and the timer starts counting again (S13). That is, the re-explanation determination process (S15) is executed at intervals of one second (updating time), until the teleconferencing terminal 100 is turned OFF.

The re-explanation determination process executed by the teleconferencing 100 will now specifically be described with reference to FIG. 9. The re-explanation determination process is executed in S15 of FIG. 8.

When the re-explanation determination process is executed, the specified browsing time and the specified number of terminals are respectively acquired from the specified browsing time storage area 1401 and the specified number-of-terminals storage area 1402 of the HDD 104 (S21). Note that the specified browsing time and the specified number of terminals are data which are stored in advance. In this embodiment, the specified browsing time is set to "30 seconds", and the specified number of terminals is set to "two", for example.

The page number being displayed on the base terminal 200 is stored in the browsing page table 1100 (S22). In the example shown in FIG. 4, a record to be added indicates "13:10:02" after the updating time "one second" has elapsed from "13:10:01". As items for "terminal A" to "terminal E" respectively corresponding to the base terminals 200, page numbers displayed on the respective base terminals 200 are stored. The page numbers are those stored in the browsing page information storage area 1103 as the shared memory area of the RAM 103 in the browsing related information reception process (see FIG. 10), in association with the terminal IDs.

For the base terminal 200 of the auditor that displays a page different from the page displayed on the base terminal 200 of the explainer, the updating time is added to the sum time stored in the browsing time sum table 1200 (S23). That is, when the auditor displays, in the individual display area 273, a page different from the page displayed in the display area 278 of the base terminal 200 of the explainer, only the updating time "one second" is added to the sum time of the browsing time sum table 1200, in association with the page number displayed on the base terminal 200 of the auditor.

Then, it is determined whether the number of the base terminals 200 of the auditors that display page data for a period of time equal to or longer than the specified browsing time is equal to or greater than the specified number of terminals (S24). In this case, the specified browsing time and the specified number of terminals are acquired in S21. Specifically, it is determined whether the number of the base terminals 200 corresponding to the page number displayed for 30 seconds or longer (specified browsing time) is equal to or more than two (specified number of terminals), in the browsing time sum table 1200. When it is determined that the number of the base terminals 200 corresponding to the specified browsing time of "30 seconds" or longer is not equal to or greater than the specified number of terminals "2" in the browsing time sum table 1200 (S24: NO), the re-explanation determination process ends.

When it is determined that the number of the base terminals 200 corresponding to the specified browsing time of "30 seconds" or longer is equal to or greater than the specified number of terminals "2" in the browsing time sum table 1200 (S24: YES), the page number being displayed on the base terminal 200 of the explainer is stored in the shared memory area of the RAM 103 (S25).

A terminal ID of any corresponding base terminal 200 is stored in the RAM 103, as a question base terminal (S26). At this time, terminal IDs of "terminal B" and "terminal C" are stored in the RAM 103 as question base terminals, in the example of the browsing time sum table 1200 shown in FIG. 5.

The page number for re-explanation and message data for re-explanation are sent to the entire base terminals 200 (S27). Then, the re-explanation determination process ends.

Figure 10:
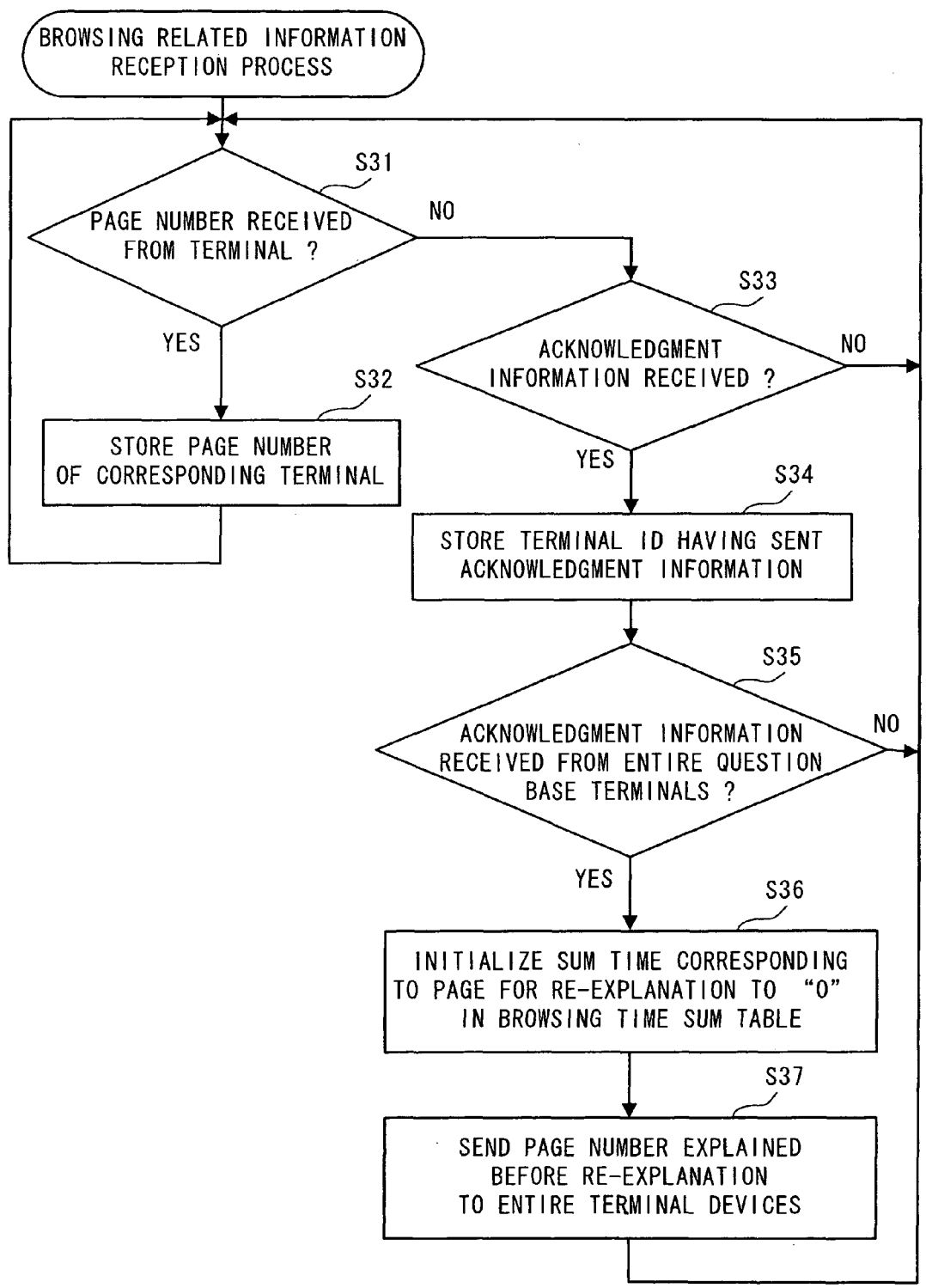
FIG. 10 is a flowchart of a subroutine in a browsing related information reception process executed by the teleconferencing terminal.

The browsing related information reception process executed by the teleconferencing terminal 100 will now specifically be described with reference to FIG. 10. The browsing related information reception process is started as child process in S12 in the main process of the teleconferencing terminal in FIG. 8. The browsing related information reception process ends, upon reception of a signal for forcibly stopping the process which is sent in S17 of FIG. 8.

When the browsing related information reception process is executed, it is determined whether a page number sent from the base terminal 200 has been received (S31). This page number corresponds to the page data displayed in the individual display area 273 on the teleconferencing terminal screen 271 of the base terminal 200. When it is determined that the page number sent from the base terminal 200 is not received (S31: NO), that is, when the base terminal 200 has not sent the page number, it is determined whether acknowledgement information sent from the base terminal 200 has been received (S33). The acknowledgement information is a signal sent from the base terminal 200 of the auditor, when the user of the base terminal 200 of the auditor presses an acknowledgement button (not illustrated), after the base terminal 200 of the explainer sends page data for re-explanation to the base terminal 200 of the auditor through the teleconferencing terminal 100.

When it is determined that the acknowledgement information is not received from the base terminal 200 of the auditor (S33: NO), the processing proceeds to S31. That is, the processings of S31 and S33 are repeated until the page number is not received from the base terminal 200 of the auditor, and the acknowledgement information is received.

When it is determined that the page number is received from the base terminal 200 (S31: YES), browsing page information storage area 1103 stores browsing page information (S32). This browsing information includes the received page number and the terminal ID of the base terminal 200 which has sent the page number in association with each other. Then, the processing proceeds to S31.

When it is determined that the acknowledgement information has been received from the base terminal 200 of the auditor (S33: YES), the terminal ID of the base terminal 200 of the auditor is stored in the RAM 103 (S34). In this case, this base terminal 200 of the auditor has sent the acknowledgement information. It is determined whether the acknowledgement information has been received from each of the entire question base terminals (S35). That is, it is determined whether the terminal IDs stored in the question base terminal information storage area 1104 all coincide with the terminal IDs stored in S34. When it is determined that the acknowledgement information is not received from the entire question base terminals (S35: NO), that is, when the terminal IDs stored in the question base terminal information storage area 1104 do not entirely coincide with the terminal IDs stored in S34, the processing proceeds to S31.

When it is determined that the acknowledgement information has been received from the entire question base terminals (S35: YES), that is, when the terminal IDs stored in the question base terminal information storage area 1104 entirely coincide with the terminal IDs stored in S34, the entire "sum times" corresponding to the corresponding page number are initialized to "0" in the browsing time sum table 1200 (S36). The page number displayed before re-explanation is sent to the entire base terminals 200 that are connected to the teleconferencing system 1 (S37), and the processing proceeds to S31. Note that the page number displayed before re-explanation corresponds to the page number stored in the shared memory area of the RAM 103 in S25 of FIG. 9.

Figure 11:
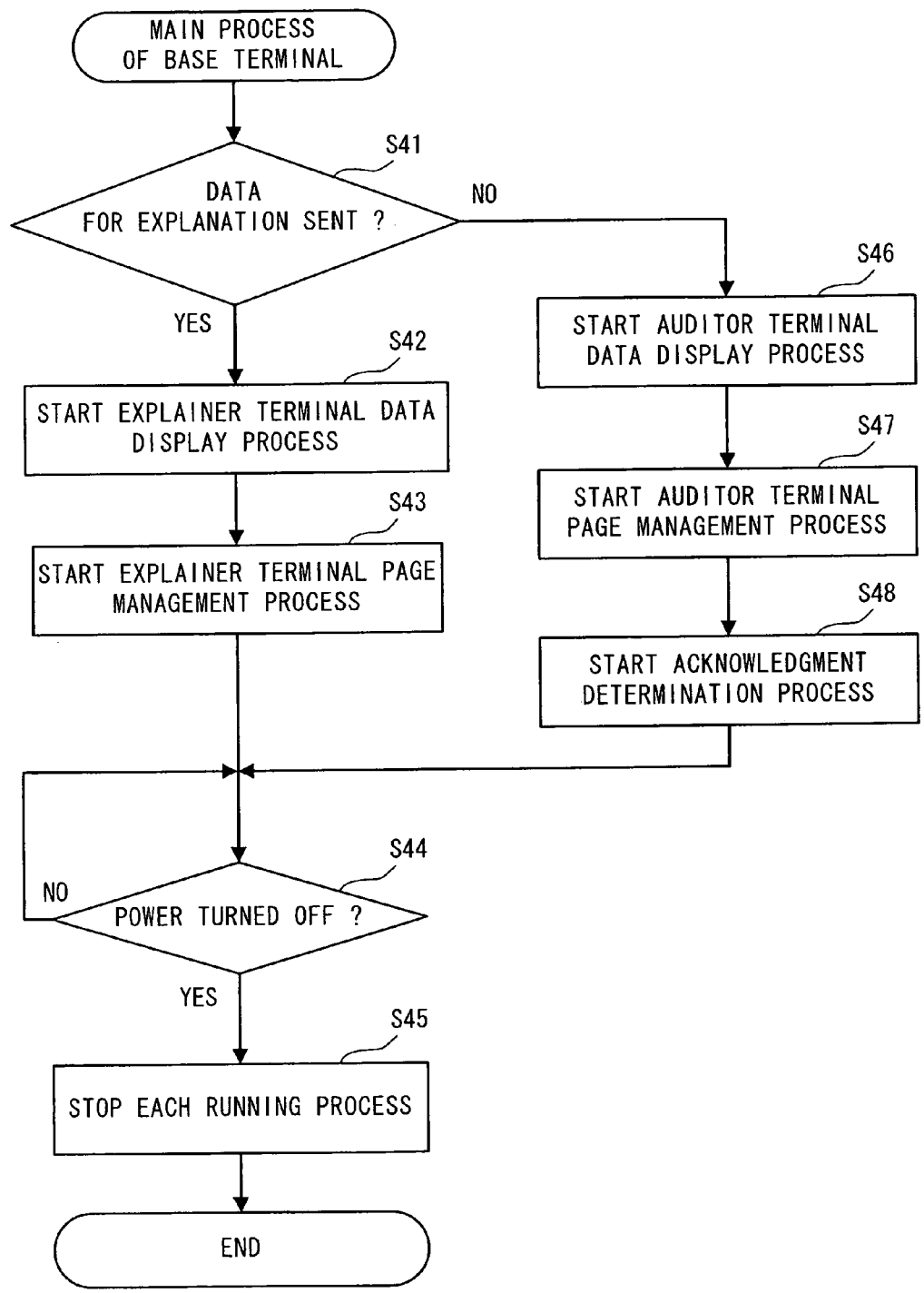
FIG. 11 is a flowchart of a main process executed by the base terminal.

The main process of the base terminal 200 will now specifically be described with reference to FIG. 11. The main process of the base terminal is executed, when the base terminal 200 is turned ON and the teleconference is started.

Upon execution of the main process of the base terminal 200, it is determined whether data for use in the teleconference has been sent to the teleconferencing terminal 100 (S41). This determination processing is made based on whether a "send" button (not illustrated) has been pressed by the user of the base terminal 200 upon selection of the data for explanation to be made in the teleconference.

When it is determined that the data for the explanation in the teleconference has been sent to the teleconferencing terminal 100 (S41: YES), that is, when the "send" button has been pressed by the user of the base terminal 200 upon selection of the data for the explanation in the teleconference, an explainer terminal data display process (see FIG. 12) is started (S42). At this time, another process different from the main process is generated, and the explainer terminal data display process operates. The main process operates as parent process, while the explainer terminal data display process started from the main process operates as child process. This explainer terminal data display process will specifically be described later. When it is determined that the data for the explanation in the teleconference has been sent to the teleconferencing terminal 100, the base terminal 200 operates as the base terminal 200 of the explainer.

Now, an explainer terminal page management process (see FIG. 13) is started (S43). At this time, another process different from the main process is generated, and the explainer terminal page management process operates. The explainer terminal page management process started from the main process operates as child process. This explainer terminal page management process will specifically be described later.

It is determined whether power is turned OFF (S44). This determination processing is made based on whether the power button (not illustrated) is pressed. When it is determined that power is not turned OFF, since the power button is not pressed (S44: NO), the processing proceeds to S44 again. That is, the main process waits until power is turned OFF.

When it is determined that data for explanation in the teleconference is not sent to the teleconferencing terminal 100 (S41: NO), that is, when a cancel button (not illustrated) is pressed instead of the "send" button, an auditor terminal data display process (see FIG. 14) is started (S46). At this time, another process different from the main process is generated, and the auditor terminal data display process operates. The auditor terminal data display process started from the main process operates as child process. This auditor terminal data display process will specifically be described later. When it is determined that data for explanation in the teleconference is not sent to the teleconferencing terminal 100, the base terminal 200 operates as the base terminal 200 of the auditor.

The auditor terminal page management process (see FIG. 15) is started (S47). At this time, another process different from the main process is generated, and the auditor terminal page management process operates. The auditor terminal page management process started from the main process operates as child process. This auditor terminal page management process will specifically be described later.

Subsequently, an acknowledgement determination process (see FIG. 16) is started (S48). At this time, another process different from the main process is generated, and the acknowledgement determination process operates. The acknowledgement determination process started from the main process operates as child process. This acknowledgement determination process will specifically be described later. Then the processing proceeds to S44.

When it is determined that power is turned OFF (S44: YES), that is, when the power button has been pressed by the user who uses the base terminal 200, each process started from the main process of the base terminal 200 is forcibly stopped (S45), thereby ending the main process. When the base terminal 200 operates as the base terminal 200 of the explainer, it sends a signal for forcibly stopping the explainer terminal data display process started in S42 and the explainer terminal page management process started in S43.

When the base terminal 200 operates as the base terminal 200 of the auditor, it sends a signal for forcibly stopping the auditor terminal data display process started in S46, the auditor terminal page management process started in S47 and the acknowledgement determination process started in S48.

Figure 12:
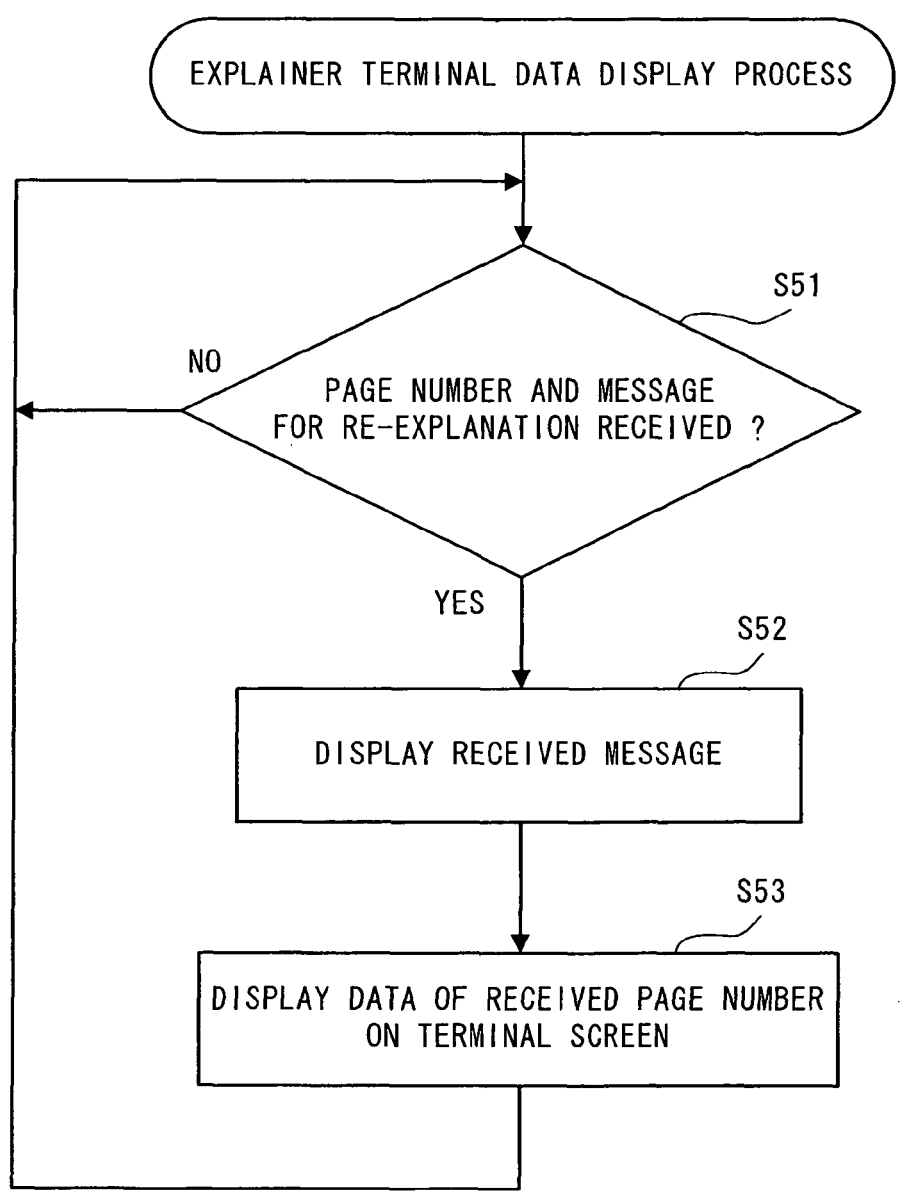
FIG. 12 is a flowchart of a subroutine in an explainer terminal data display process executed by the base terminal.

The explainer terminal data display process executed by the base terminal 200 of the explainer will now be described with reference to FIG. 12. The explainer terminal data display process is started in S42 of FIG. 11. The explainer terminal data display process ends, upon reception of the forcible stopping signal sent in S45 of FIG. 11.

It is determined whether the page number for re-explanation and the message for re-explanation have been received, upon execution of the explainer terminal data display process (S51). This page number and the message are to be sent from the teleconferencing terminal 100 in S27 of FIG. 9.

When it is determined that the page number for re-explanation and the message for re-explanation have been received (S51: YES), the received message for re-explanation is displayed on the teleconferencing terminal screen 271 (S52). The base terminal 200 of the explainer displays the message for re-explanation in the whole display area including both the shared display area 272 and the individual display area 273. One example of the message for re-explanation is "The total browsing time of already-explained pages (page 3) has exceeded a predetermined time. Please explain again, if there is any further question."

Page data corresponding to the received page number for re-explanation is displayed after a predetermined time period (S53), and the processing proceeds to S51. That is, in the explainer terminal data display process, the processings from S52 to S53 are executed every time the page number for re-explanation and the message for re-explanation are received. Let it be assumed that the predetermined time is 10 seconds. When it is determined that the page number for re-explanation and the message for re-explanation is not received (S51: NO), the processing proceeds to S51 again.

Figure 13:
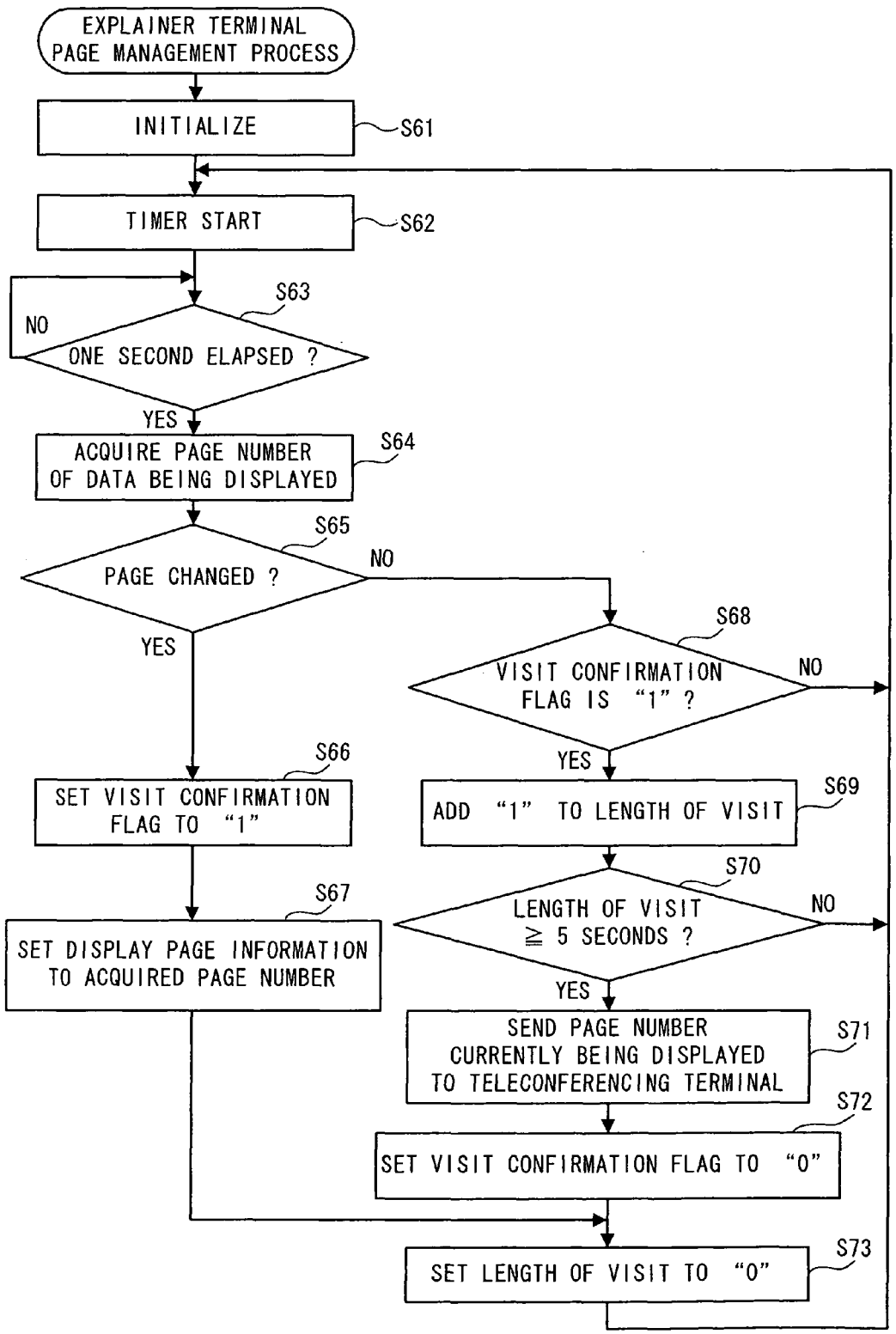
FIG. 13 is a flowchart of a subroutine in an explainer terminal page management process executed by the base terminal.

The explainer terminal page management process executed by the base terminal 200 of the explainer will now be described with reference to FIG. 13. The explainer terminal page management process is started in S43 of FIG. 11. Note that the explainer terminal page management process ends, upon reception of the forcible stopping signal sent in S45 of FIG. 11.

When the explainer terminal page management process is executed, data items of "length of visit", "display page information" and "visit confirmation flag" stored in the RAM 203 are initialized (S61). In this case, the value of "length of visit" is set to "0", the value of "display page information" is set to "0", and the value of "visit confirmation flag" is set to "0".

Now, the timer starts counting (S62). The counting measurement processing is done using a second counter as a timer counter. The measurement begins, after the second counter is initialized to "0". The second counter counts up based on a signal from the timing device 206 connected to the CPU 201.

It is determined whether one second has elapsed (S63). This determination processing is made as to whether the value of the second counter has elapsed one second. When it is determined that one second has not elapsed (S63: NO), the determination processing of S63 is executed again. That is, the determination processing of S63 is repeated until the value of the second counter exceeds one second.

When one second has elapsed (S63: YES), that is, when the value of the second counter is equal to or greater than one second, the page number of page data displayed on the teleconference terminal screen 271 is acquired (S64). It is determined whether any change has been made to the page data displayed on the teleconferencing terminal screen 271 (S65). This determination processing is made based on whether the page number acquired in S64 is the same as the value of the display page information stored in the RAM 203.

When it is determined that any change has been made to the page data displayed on the teleconferencing terminal screen 271 (S65: YES), that is, when it is determined that the page number acquired in S64 is not the same as the value of the display page information stored in the RAM 203, the value of the visit confirmation flag stored in the RAM 203 is set to "1" (S66). The page number acquired in S64 is set into the display page information stored in the RAM 203 (S67). The length of visit stored in the RAM 103 is set to "0" (S73), and the processing proceeds to S62.

When it is determined that no change has been made to the page data displayed on the teleconferencing terminal screen 271 (65: NO), that is, when it is determined that the page number acquired in S64 is not the same as the display page information stored in the RAM 203, it is determined whether the value of the visit confirmation flag stored in the RAM 203 is "1" (S68).

When the value of the visit confirmation flag stored in the RAM 203 is not "1" (S68: NO), the processing proceeds to S62. When the value of the visit confirmation flag stored in the RAM 203 is "1" (S68: YES), "1" is added to the value of the length of visit stored in the RAM 203 (S69). Then it is determined whether the value of the length of visit stored in the RAM 203 is equal to or greater than "5" (S70). That is, it is determined whether the same page data is being displayed for 5 seconds or longer on the teleconferencing terminal screen 271 of the base terminal 200 of the explainer.

When it is determined that the value of the length of visit stored in the RAM 203 is not equal to or greater than "5" (S70: NO), that is, when it is determined that the same page data is displayed for less than five seconds on the teleconferencing terminal screen 271 of the base terminal 200 of the explainer, the processing proceeds to S62.

When it is determined that the value of the length of visit stored in the RAM 203 is equal to or greater than "5" (S70: YES), that is, when the same page data is displayed for five seconds or longer on the teleconferencing terminal screen 271 of the base terminal 200 of the explainer, the page number being displayed on the teleconferencing terminal screen 271 is sent to the teleconferencing terminal 100 (S71). The sent page number is received in S31 of FIG. 10.

The value of the visit confirmation flag stored in the RAM 203 is set to "0" (S72), and the processing proceeds to S73.

Figure 14:
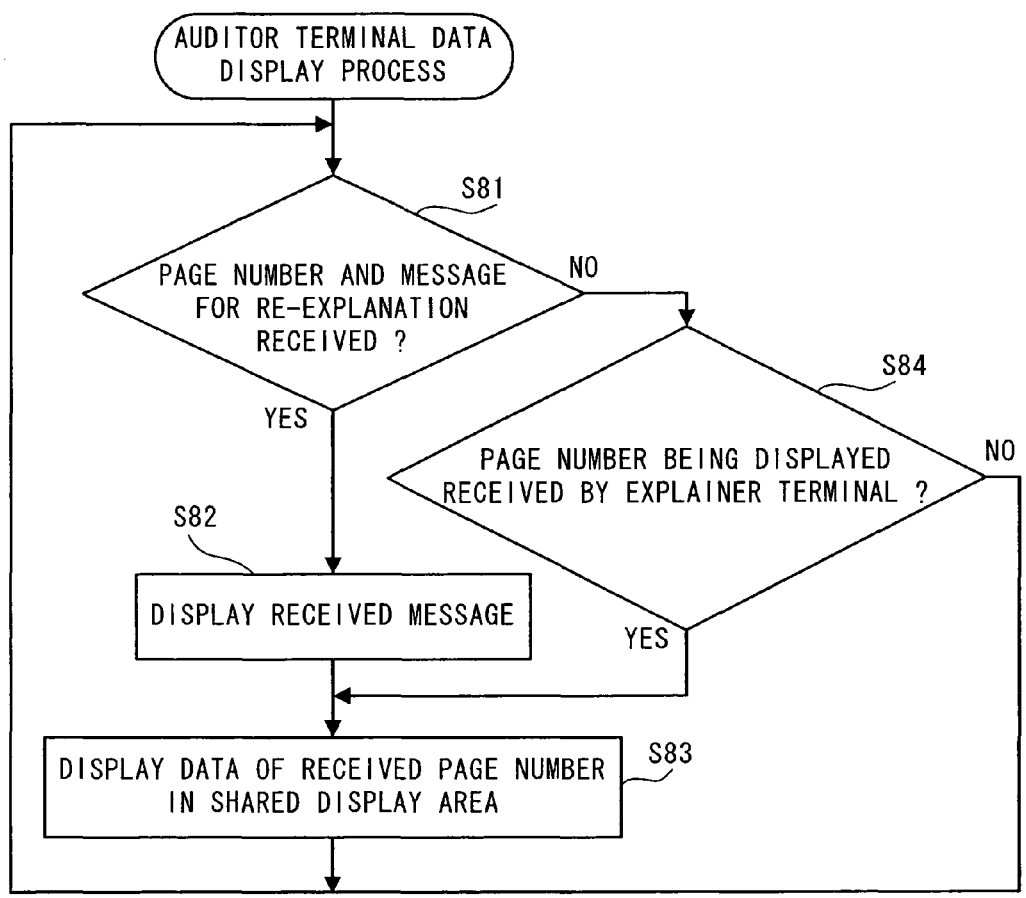
FIG. 14 is a flowchart of a subroutine in an auditor terminal data display process executed by the base terminal.

The auditor terminal data display process executed by the base terminal 200 of the auditor will now specifically be described with reference to FIG. 14. The auditor terminal data display process is started in S46 of FIG. 11. The auditor terminal data display process ends, upon reception of the forcible stopping signal sent in S45 of FIG. 11.

When the auditor terminal data display process is executed, it is determined whether the page number for re-explanation and the message for re-explanation have been received (S81). This page number and the message are those sent from the teleconferencing terminal 100 in S27 of FIG. 9.

When it is determined that the page number for re-explanation and the message for re-explanation have been received (S81; YES), the received message for re-explanation is displayed on the teleconferencing terminal screen 271 (S82). The base terminal 200 of the auditor displays the message for re-explanation in the whole area including both the shared display area 272 and the individual display area 273. One example of the message for re-explanation is "The total browsing time of already-explained pages (page 3) has exceeded a predetermined time. For those who use the base terminals B and C, please ask a question, if there is any".

Page data corresponding to the received page number for re-explanation is displayed in the shared display area 272 of the teleconferencing terminal screen 271, after a predetermined period of time (S83), and the processing proceeds to S81. That is, in the auditor terminal data display process, the processings of S82 and S83 are executed, every time the page number for re-explanation and the message for re-explanation are received. Note that the predetermined period of time is "10" seconds, for example.

When it is determined that the page number for re-explanation and the message for re-explanation is not received (S81: NO), it is determined whether the page number being displayed on the base terminal 200 of the explainer has been received (S84). This page number is the one received in S37 of FIG. 10.

When it is determined that the page number being displayed on the base terminal 200 of the explainer is not received from the teleconferencing terminal 100 (S84: NO), the processing proceeds to S81. When it is determined that the page number being displayed on the base terminal 200 of the explainer has been received (S84: YES), the processing proceeds to S83. Then, the page data corresponding to the received page data is displayed in the shared display area 272 of the teleconferencing terminal screen 271 (S83).

Figure 15:
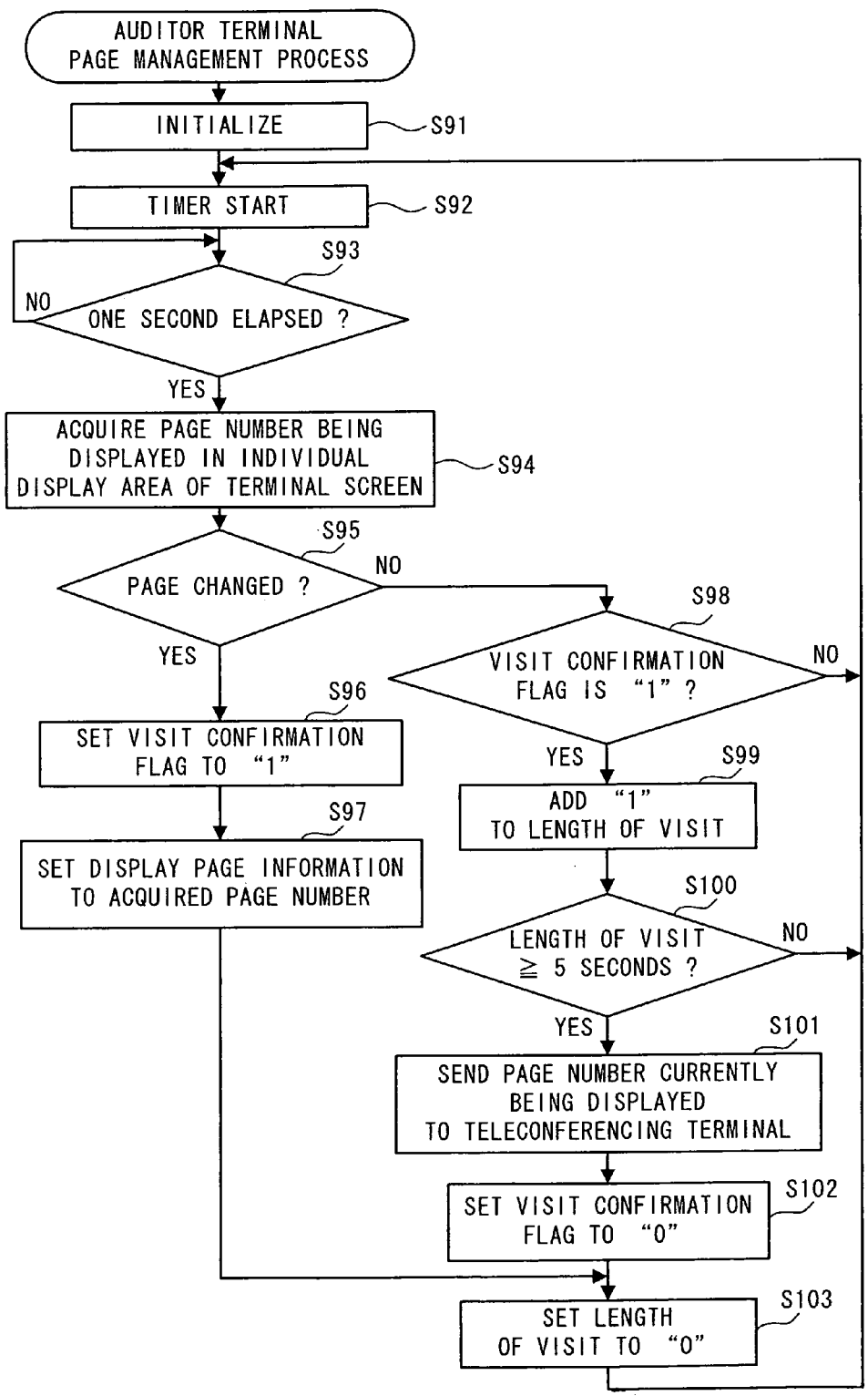
FIG. 15 is a flowchart of a subroutine in an auditor terminal page management process executed by the base terminal.

The auditor terminal page management process executed by the base terminal 200 of the auditor will now be explained with reference to FIG. 15. The auditor terminal page management process is started in S47 of FIG. 11. The auditor terminal page management process ends, upon reception of a forcible stopping signal sent in S45 of FIG. 11.

When the auditor terminal page management process is executed, data items of "length of visit", "display page information" and "visit confirmation flag" stored in the RAM 203 are initialized (S91). In this case, the value of "length of visit" is set to "0", the value of "display page information" is set to "0", and the value of "visit confirmation flag" is set to "0".

The timer starts counting (S92). The counting measurement processing is performed with a third counter as a timer counter. The measurement begins, after the third counter is initialized to "0". The third counter counts up, based on a signal from the timing device 206 connected to the CPU 201.

It is determined whether the value of the timer has exceeded one second (S93). This determination processing is made based on whether the value of the third counter has exceeded one second. When it is determined that the value of the third counter has not exceeded one second (S93: NO), the determination processing of S93 is executed again. That is, the determination processing of S93 is repeated until the value of the third counter exceeds one second.

When it is determined that the value of the timer has exceeded one second (S93: YES), that is, when the value of the third counter is equal to or greater than one second, the page number of the page data displayed in the individual display area 273 of the teleconferencing terminal screen 271 is acquired (S94). It is determined whether any change has been made to the page data displayed in the individual display area 273 of the teleconferencing terminal screen 271 (S95). This determination processing is made based on whether the page number acquired in S94 is the same as the value of the display page information stored in the RAM 203.

When it is determined that any change has been made to the page data displayed in the individual display area 273 of the teleconferencing terminal screen 271 (S95; YES), that is, when it is determined that the page number acquired in S94 is not the same as the value of the display page information stored in the RAM 203, the value of the visit confirmation flag stored in the RAM 203 is set to "1" (S96). The page number acquired in S94 is set into the display page information stored in the RAM 203 (S97). The length of visit stored in the RAM 103 is set to "0" (S103), and the processing proceeds to S92.

When it is determined that no change has been made to the page data displayed in the individual display area 273 of the teleconferencing terminal screen 271 (S95: NO), that is, when it is determined that the page number acquired in S94 is not the same as the value of the display page information stored in the RAM 203, it is determined whether the value of the visit confirmation flag stored in the RAM 203 is "1" (S98).

When the value of the visit confirmation flag stored in the RAM 203 is not "1" (S98: NO), the processing proceeds to S92. When the value of the visit confirmation flag stored in the RAM 203 is "1" (S98: YES), "1" is added to the value of the length of visit stored in the RAM 203 (S99). Next, it is determined whether the value of the length of visit stored in the RAM 203 is equal to or greater than "5" (S100). That is, it is determined whether the same page data is being displayed for five seconds or longer in the individual display area 273 of the teleconferencing terminal screen 271 of the base terminal 200 of the explainer.

When it is determined that the value of the length of visit stored in the RAM 203 is not equal to or greater than "5" (S100: NO), that is, when the same page data is not displayed for five seconds or longer in the individual display area 273 of the teleconferencing terminal screen 271 of the base terminal 200 of the explainer, the processing proceeds to S92.

When it is determined that the value of the length of visit stored in the RAM 203 is equal to or greater than "5" (S100: YES), that is, when the same page data is has been displayed for five seconds or longer in the individual display area 273 of the teleconferencing terminal screen 271 of the base terminal 200 of the explainer, the page number displayed in the individual display area 273 of the teleconferencing terminal screen 271 is sent to the teleconferencing terminal 100 (S101). The sent page number is received in S31 of FIG. 10.

The value of the visit confirmation flag stored in the RAM 203 is set to "0" (S102), and the processing proceeds to S103.

Figure 16:
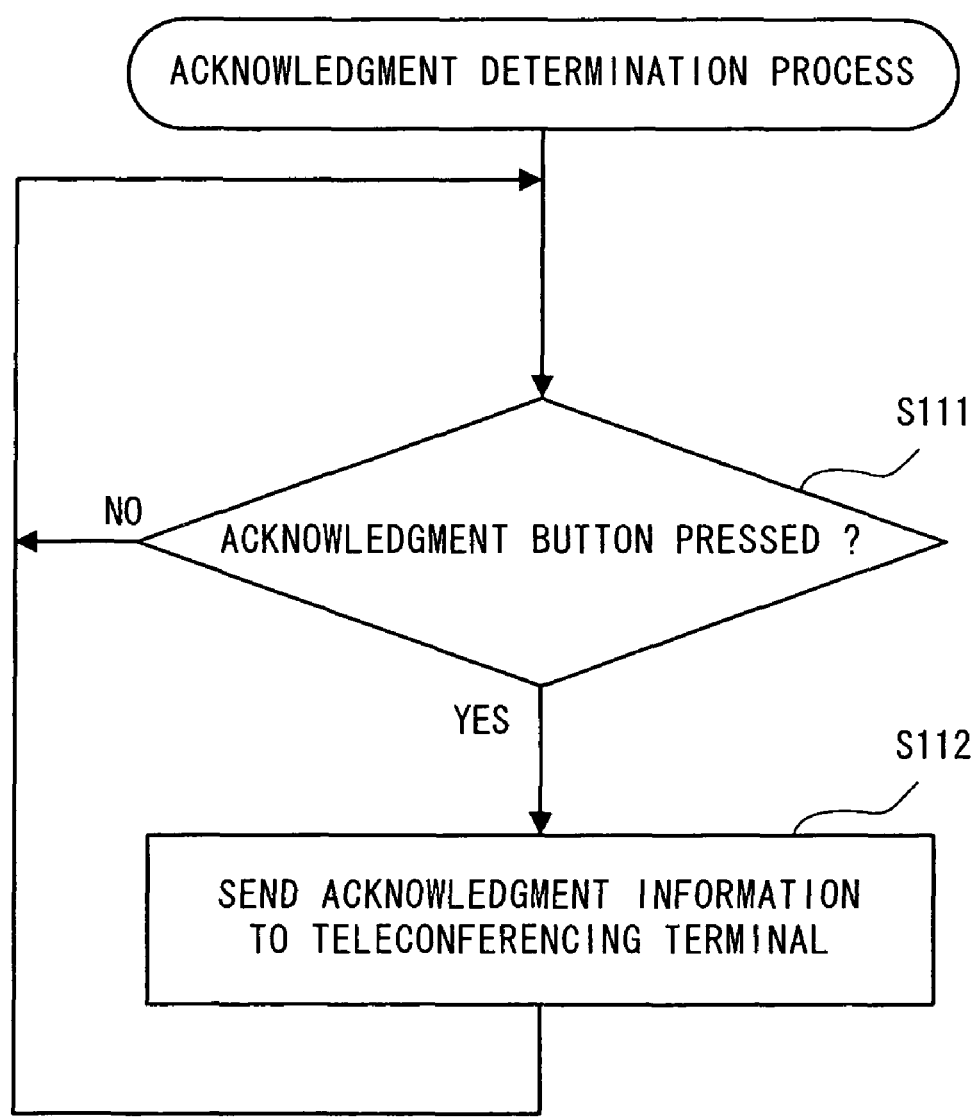
FIG. 16 is a flowchart of a subroutine in an acknowledgement determination process executed by the base terminal.

The acknowledgment determination process executed by the base terminal 200 of the auditor will now be described with reference to FIG. 16. The acknowledgment determination process is started in S48 of FIG. 11. The acknowledgment determination process ends, upon reception of a forcible stopping signal sent in S45 of FIG. 11.

When the acknowledgment determination process is executed, it is determined whether a user has pressed the acknowledgement button 277 upon acknowledgement of the contents of the re-explanation (S111). Note that this user has received re-explanation about page data from the explainer.

When it is determined that the acknowledgement button 277 is not pressed (S111: NO), the determination processing of S111 is executed again. That is, the determination processing of S111 is repeatedly executed until the acknowledgment button 277 is pressed.

When it is determined that the acknowledgement button has been pressed (S111: YES), information indicating that the acknowledgment button 277 has been pressed is sent to the teleconferencing terminal 100 (S122), and the processing proceeds to S111 again. Note that the sent acknowledgment information is received in S35 of FIG. 10.

As described above, in this embodiment, the teleconferencing terminal 100 receives the page number displayed in the individual display area 273 of each base terminal 200 of the auditor participating in the teleconference. When page data which is different from the page data displayed in the display area 278 of the base terminal 200 of the explainer, is displayed on the base terminal 200 of the auditor, the display sum time of the page data is stored into the browsing time sum table 1200 in association with each base terminal 200.

There may be a plurality of base terminals 200 of the auditors that correspond to the display sum times equal to or longer than the already-specified browsing time, with reference to the display times stored in the browsing time sum table 1200. In this case, the page number for re-explanation by the explainer and the message data for re-explanation are sent to the entire base terminals 200 connected to the teleconferencing system 1. When the base terminal 200 of the auditor has received the page number for re-explanation by the explainer and the message data for re-explanation, the received message for re-explanation is displayed on the teleconferencing terminal screen 271 of the auditor. The page data corresponding to the received page number for re-explanation is displayed in the shared display area 272 of the teleconferencing terminal screen 271 of the base terminal 200 of the auditor, after a predetermined period of time.

Accordingly, the teleconferencing terminal 100 can automatically detect a page(s) that the user of the base terminal 200 frequently browses, and the explainer can easily determine any page(s) for re-explanation. In the teleconference, the auditor who receives explanation from the explainer confirms the message displayed in the display area. This gives an opportunity for the auditor to ask a question to the explainer. Further, when the page necessary for re-explanation is displayed on each base terminal 200, the explainer can easily and specifically give an explanation to the auditor who receives explanation.

It is to be noted that this disclosure is not limited to the above-described embodiment, and of course, various changes may be made without departing from the scope of this disclosure. Modifications of this disclosure will now be described.

Figure 9:
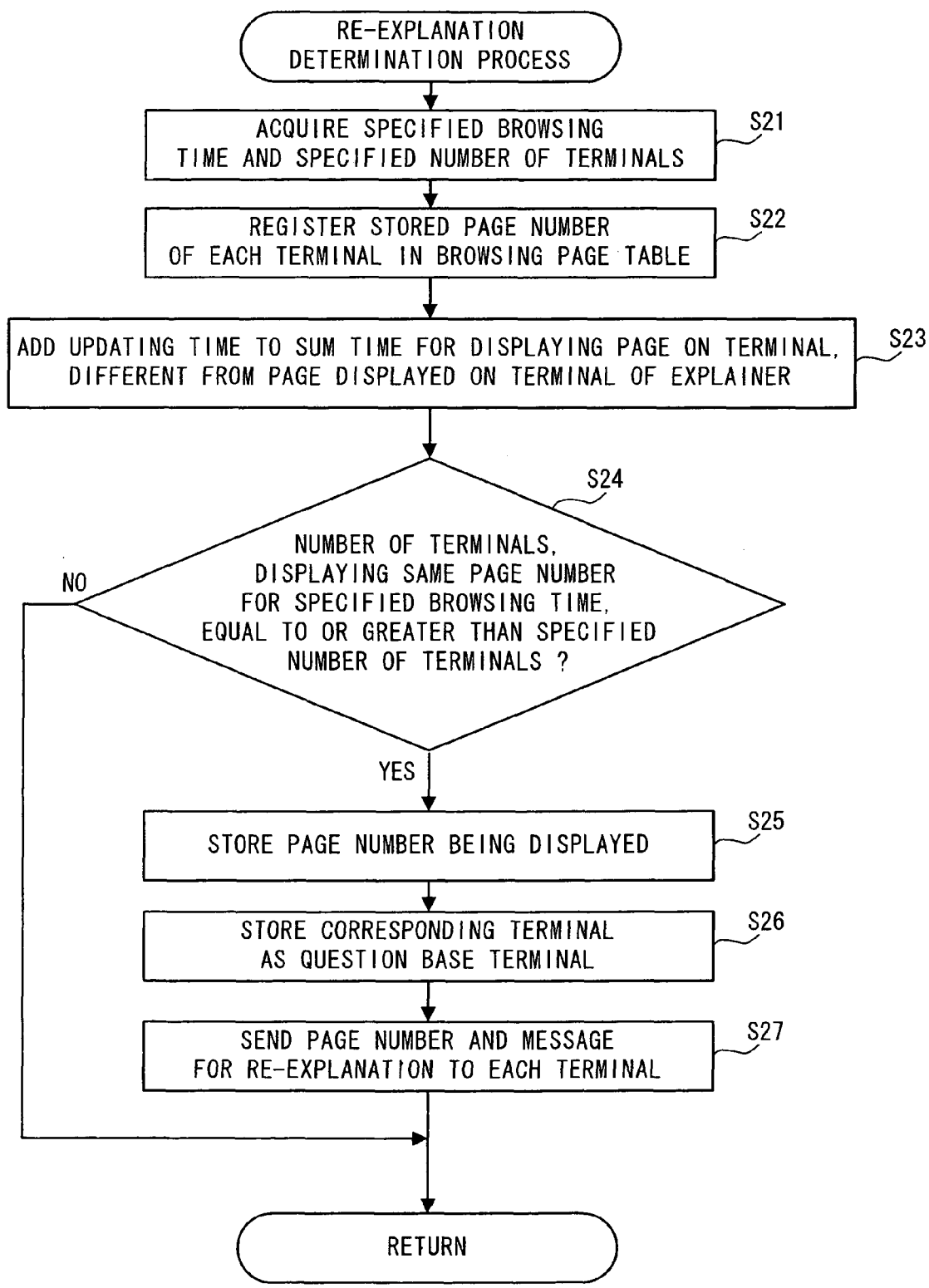
FIG. 9 is a flowchart of a subroutine in a re-explanation determination process executed by the teleconferencing terminal.

In this above-described embodiment, in the re-explanation determination process of FIG. 9, the page number of the page data for re-explanation is determined, based on the specified browsing time stored in the specified browsing time storage area 1401 and the specified number of terminals stored in the specified number-of-terminals storage area 1402 of the HDD 104 of the teleconferencing terminal 100. However, this disclosure is not limited to this embodiment.

For example, in the specified base terminal 200 of the auditor, the page data which is displayed in the individual display area 273 and is also browsed for the specified browsing time or longer may be determined as page data for re-explanation. This will be described in detail with reference to FIG. 17. The HDD 104 of the teleconferencing terminal 100 is provided with a specified terminal storage area (not illustrated) in addition to the specified browsing time storage area 1401. This specified terminal storage area stores terminal IDs of the specified base terminals 200 of the auditors as specified base terminals. Any other configurations are the same as those described in the above embodiment, and thus will not be described hereinafter. In the re-explanation determination process of FIG. 17, the processings from S122 to 123 and the processings from S125 to S127 are the same as the processings from S22 to S23 and the processings from S25 to S27 of FIG. 9, and thus will not described in detail.

Figure 17:
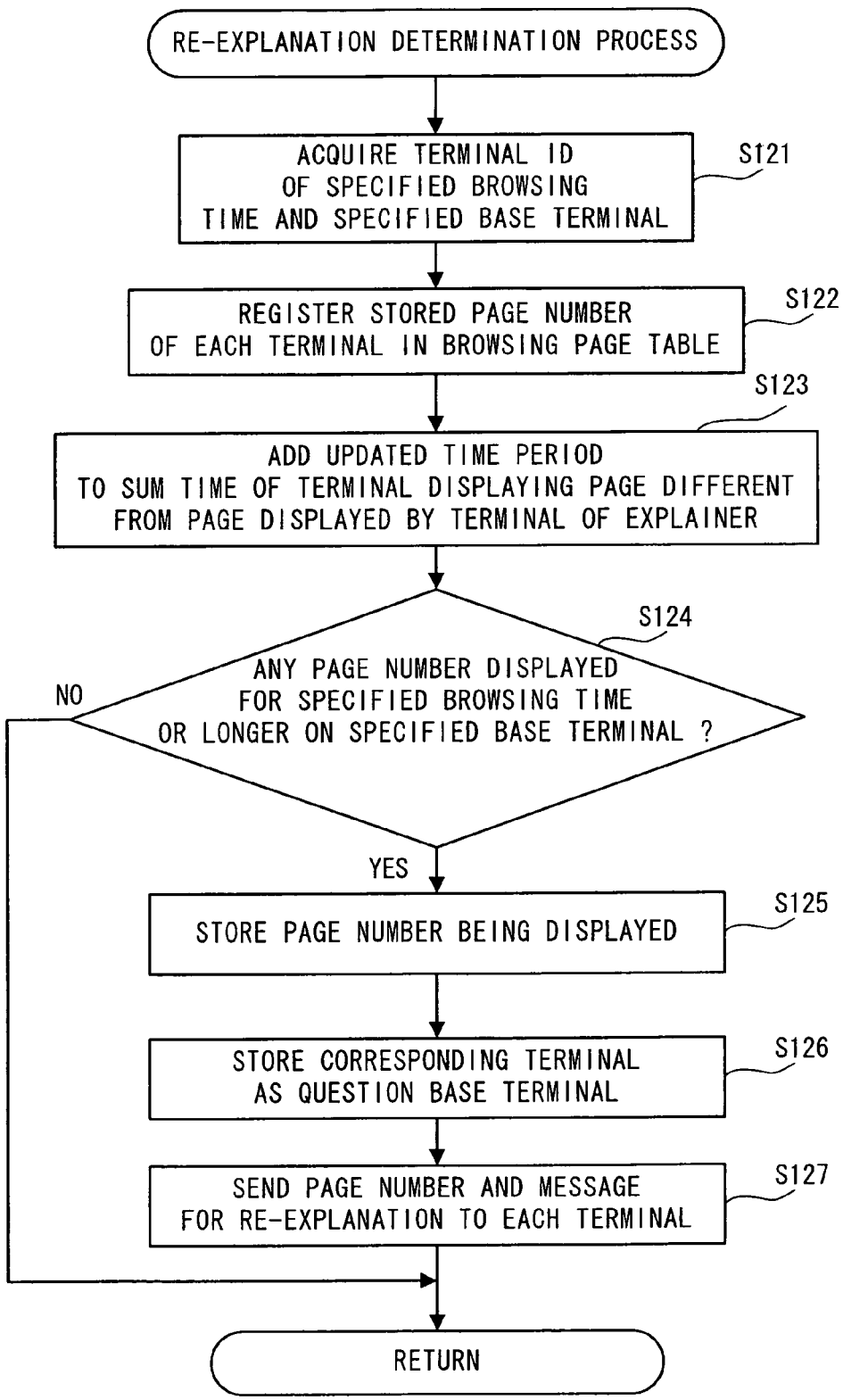
FIG. 17 is a flowchart of a subroutine in a re-explanation determination process executed by a teleconferencing terminal according to a first modification.

When the re-explanation determination process in the first modification of FIG. 17 is executed, the specified browsing time stored in the specified browsing time storage area 1401 and the terminal ID stored in the specified terminal storage area are acquired (S121). In this embodiment, the specified browsing time is set to "20 seconds", and the terminal ID of the specified base terminal is set to "terminal D", by way of example.

Subsequently, the processings from S122 to S123 are executed. As to the base terminal 200 specified with the terminal ID acquired in S121, it is determined whether there is any page data which has been displayed in the individual display area 273 for a period of time equal to or longer than the specified browsing time acquired in S121 (S124). That is, as to the specified base terminal "terminal D", it is determined whether there is a page number displayed for 20 seconds (specified browsing time) or longer in the browsing time sum table 1200.

When there is page data which is displayed in the individual display area 273 for a period of time equal to or longer than the specified browsing time acquired in S121 (S124: YES), that is, as to "terminal D" as a specified base terminal, when there is any page number displayed for 20 seconds (specified browsing time) or longer in the browsing time sum table 1200, the processings from S125 to S127 are executed, so as to end the re-explanation determination process. Such page number corresponds to the page number "4" in the browsing time sum table 1200 shown in FIG. 5, by way of example.

When there is no page data which is displayed in the individual display area 273 for the specified browsing time or longer acquired in S121 (S124: NO), that is, as to "terminal D" as a specified base terminal, when there is no page number displayed for 20 seconds (specified browsing time) or longer in the browsing time sum table 1200, the re-explanation determination process ends.

As described above, in the first modification, the specified browsing time and the specified base terminal are stored in advance in the HDD 104. When some page data is displayed in the individual display area 273 on the base terminal 200 as the specified base terminal for a predetermined browsing time or longer, the corresponding page number is determined as a page number of high necessity of re-explanation. Thus, it is possible to easily determine the page number which is frequently browsed by the base terminal 200 of the auditor and also the page number of high necessity of re-explanation, based on a predetermined condition. As a result, there is no need for the explainer of the teleconference to select the page which is frequently browsed by the base terminal 200 of the auditor and which has high necessity of re-explanation.

The condition for determining the page data for re-explanation may be any condition other than that of the above-described embodiment or the first modification.

For example, the page data for re-explanation may be determined based on an order of priority given to the base terminals 200 of the auditors. This page data is displayed in the individual display area 273 for a period of time equal to or longer than the specified browsing time. When the first page data is determined based on the order of priority, the page data is set as the data for re-explanation. This will be described in detail with reference to FIGS. 18 and 19. The HDD 104 of the teleconferencing terminal 100 is provided with a priority table storage area (not illustrated) storing a priority table 1300 (see FIG. 18). Any other configurations are the same as those of the above-described embodiment, and thus will not be described again. In the re-explanation determination process of FIG. 19, the processings from S132 to S133 are the same as those of S22 to S23 of FIG. 9, and thus will not be described hereinafter. The processings from S135 to S137 of FIG. 19 are the same as those of S25 to S27 of FIG. 9, and thus will not be described again.

Figure 18:
FIG. 18 is a schematic diagram showing a configuration of a priority table according to a second modification.

The priority table 1300 will now be described with reference to FIG. 18. The priority table 1300 stores terminal IDs of specified base terminals corresponding to the order of priority and specified browsing times in association with each other.

The re-explanation determination process (see FIG. 19) is executed to determine whether there is page data displayed in the individual display area 273 for a period of time equal to or longer than the specified browsing time corresponding to the priority. This process is executed for each of the base terminals 200 specified with the specified base terminals corresponding to their priority, in the order of high priority stored in the priority table 1300.

Figure 19:
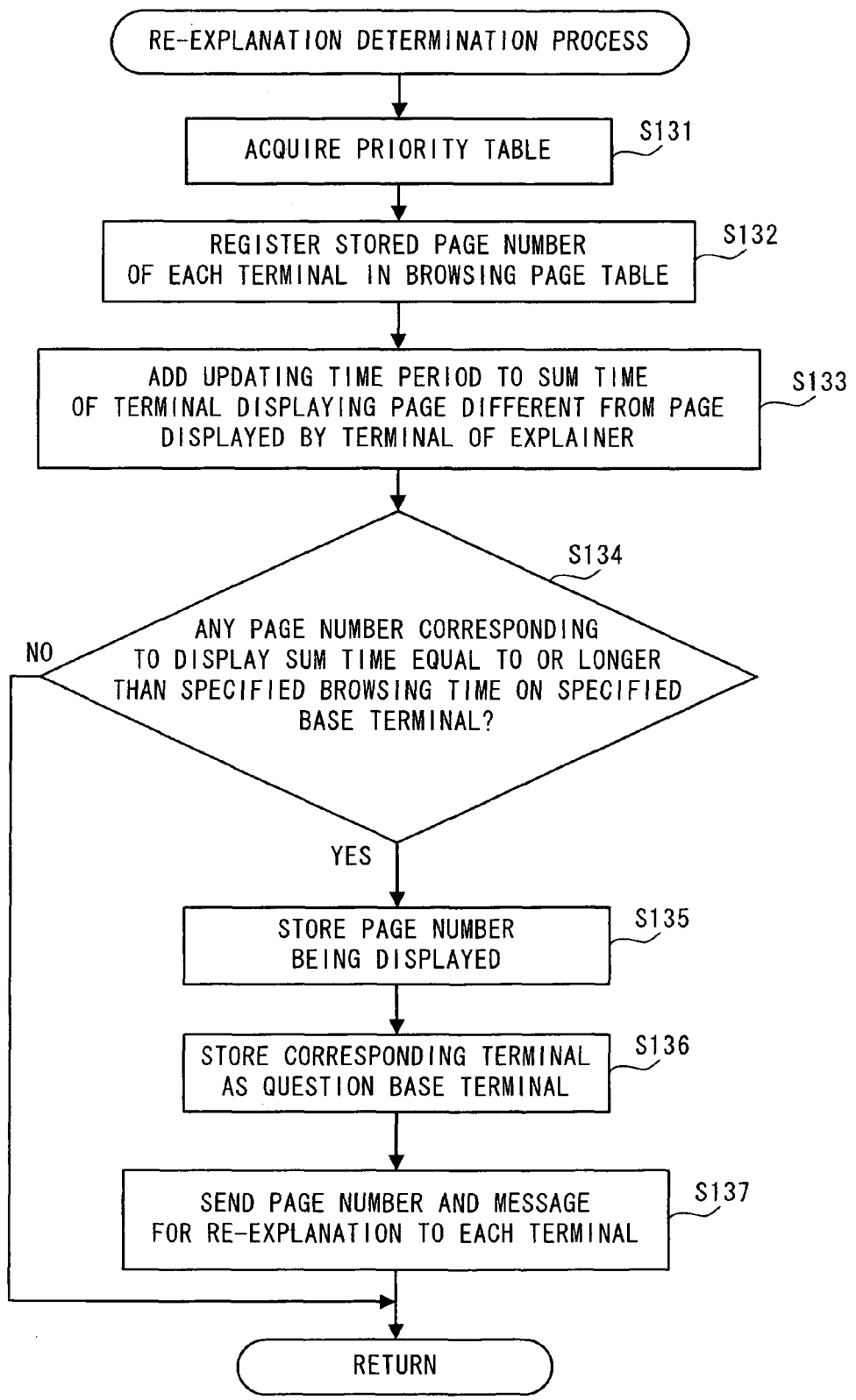
FIG. 19 is a flowchart of a subroutine in a re-explanation determination process executed by a teleconferencing terminal according to the second modification.

When the re-explanation determination process according to a second modification of FIG. 19 is executed, the priority table 1300 stored in the priority table storage area (not illustrated) of the HDD 104 is acquired (S131). In this embodiment, as shown in FIG. 18, the specified base terminal corresponding to the priority "1" is set to "terminal B", and its specified browsing time is set to "35 seconds", by way of example. In addition, the specified base terminal corresponding to the priority "2" is set to "terminal D", and its specified browsing time is set to "20 seconds".

After this, the processings from S132 to S133 are executed. Now, it is determined whether there is a page number which has been displayed for a period of time equal to or longer than a corresponding specified browsing time, in association with the base terminal 200 specified with a corresponding specified base terminal, in accordance with the priority shown in the priority table 1300 acquired in S131 (S134). That is, it is determined whether there is a page number which has been displayed for a period of time equal to or longer than "35 seconds" (specified browsing time), in association with "terminal B" as the specified base terminal corresponding to the priority "1", in the browsing time sum table 1200. When there is no page number corresponding to the priority "1" in the browsing time sum table 1200, the same determination processing is performed for the data corresponding to the priority "2".

When it is determined that there is a page number displayed for a period of time equal to or longer than the corresponding specified browsing time, in association with the base terminal 200 specified as the corresponding specified base terminal, in accordance with the priority of the priority table 1300 (S134: YES), the processings from S135 to S137 are executed, and the re-explanation determination process ends. For example, the corresponding page number is "3" in association with the specified base terminal "terminal B" corresponding to the priority "1", in the browsing time sum table 1200 shown in FIG. 5 and in the priority table 1300 shown in FIG. 18.

When it is determined that there is no page number displayed for a period of time equal to or longer than a corresponding specified browsing time (S134: NO), the processings from S135 to S137 are not executed, and the re-explanation determination process ends. This determination processing is made for the base terminal 200 specified with a corresponding specified base terminal, in accordance with the priority of the priority table 1300.

As described above, in the second modification, the priority table 1300 is stored in the priority table storage area (not illustrated) of the HDD 104. When there is a page number corresponding to page data which is displayed in the individual display area 273 for a period of time equal to or longer than the specified browsing time corresponding to priority, the corresponding page number is determined as a page number with high necessity of re-explanation. This determination processing is made in association with the base terminal 200 specified with the specified base terminal corresponding to the priority, in accordance with the priority order of the priority table 1300. As a result, there is no need for the explainer in the teleconference to select a page, which is frequently displayed in the individual display area 273 of the base terminal 200 of the auditor and has high necessity of re-explanation.

This is not much of a subject even in a combination of two or more determination conditions in the above-described embodiment, the first modification and the second modification, when determining a page number for re-explanation in the re-explanation determination process. In particular, the page number for re-explanation may be determined, in accordance with a combination of two or more determination conditions of S24 of FIG. 9, S124 of FIG. 17 and S134 of FIG. 19. Note that each of the processings has its corresponding priority.

What is claimed is:

1. A teleconferencing apparatus configured to control a teleconference to be performed between a plurality of terminal apparatus, each of the plurality of terminal apparatus including a shared display area and an individual display area, the teleconferencing apparatus comprising:
   a page information reception determination device configured to determine whether page information as information for identifying a page of display data being displayed in the individual display area has been received;
   a browsing page information storage control device configured to, when the page information reception determination device determines that the page information has been received, cause a browsing page information storage device to store, as browsing page information, identification information for identifying at least one of the plurality of terminal apparatus having sent the page information and the received page information, in association with each other;
   a browsing time information storage device configured to store, as browsing time information, the page information of the display data displayed in the individual display area and a display time indicating a time in which a page specified with the page information being displayed in the individual display area is different from a page being displayed in the shared display area, in association with each other for each pieces of the identification information;
   a page information determination device configured to determine whether there exists the browsing time information satisfying a predetermined criterion for sending the page information to the at least one of the plurality of terminal apparatus, of the browsing time information stored in the browsing time information storage device; and
   a sending device configured to, when the page information determination device determines that there exists the browsing time information satisfying the predetermined criterion, send message data indicating that the page specified with the page information is displayed on the at least one of the plurality of terminal apparatus and page information of the browsing time information satisfying the predetermined criterion, to the at least one of the plurality of terminal apparatus connected to the teleconference.

2. The teleconferencing apparatus according to claim 1, further comprising:
   an updating time determination device configured to determine whether a first predetermined time has elapsed, as a time period for updating the browsing time information stored in the browsing time information storage device; and
   a browsing time information updating device configured to, when the updating time determination device determines that the first predetermined time has elapsed, update the display time corresponding to the page information of the browsing page information to a time period with the first predetermined time added thereto, in the browsing time information stored in the browsing time information storage device and corresponding to the identification information of the browsing page information stored in the browsing page information storage device, wherein the page information determination device further configured to determine whether there exists the browsing time information satisfying the predetermined criterion of the browsing time information stored in the browsing time information storage device, when the browsing time information updating device has updated the display time corresponding to the page information of the browsing page information to a time period with the first predetermined time added thereto.

3. The teleconferencing apparatus according to claim 1, further comprising:

a first storage device configured to store the number of terminals which corresponds to the number of the plurality of terminal apparatus and a second predetermined time as a criterion time for displaying a page, which is specified with the page information, in the individual display area, wherein the predetermined criterion is satisfied when there exists the number of terminals or more corresponding to the display time of the browsing time information which is equal to or longer than the second predetermined time stored in the first storage device of the browsing time information stored in the browsing time information storage device.

4. The teleconferencing apparatus according to claim 1, further comprising:

a terminal apparatus specifying device configured to specify at least one terminal apparatus of the plurality of terminal apparatus connected to the teleconference; and a time specifying device configured to specify a third predetermined time as a criterion time for displaying a page, which is specified with the page information, in the individual display area of the at least one terminal apparatus specified by the terminal apparatus specifying device, wherein the predetermined criterion is satisfied when there exists the display time of the browsing time information that is equal to or longer than the third predetermined time specified by the time specifying device of the browsing time information corresponding to the identification information of the at least one terminal apparatus specified by the terminal apparatus specifying device.

5. The teleconferencing apparatus according to claim 1, further comprising:

a second storage device configured to store the identification information, a fourth predetermined time as a criterion time for displaying a page, which is specified with the page information, in the individual display area, and a priority order for searching for the identification information stored in the browsing time information storage device, in association with each other, wherein the predetermined criterion is satisfied when there exists at least one display time of the browsing time information which is equal to or longer than the fourth predetermined time stored to correspond to the priority order, of the browsing time information corresponding to the identification information stored to correspond to the priority order, in order of high priority of the priority order stored in the second storage device.

6. A teleconferencing system comprising:

a teleconferencing apparatus configured to control a teleconference to be performed between a plurality of terminal apparatus, each of the plurality of terminal apparatus having a display area, the display area including a shared display area and an individual display area, the teleconferencing apparatus including:

a page information reception determination device configured to determine whether page information as information for identifying a page of display data being displayed in the individual display area has been received;

a browsing page information storage control device configured to, when the page information reception determination device determines that the page information has been received, cause a browsing page information storage device to store, as browsing page information, identification information for identifying at least one of the plurality of terminal apparatus having sent the page information and the received page information, in association with each other;

a browsing time information storage device configured to store, as browsing time information, the page information of the display data displayed in the individual display area and a display time indicating a time in which a page specified with the page information being displayed in the individual display area is different from a page being displayed in the shared display area, in association with each other for each piece of the identification information;

a page information determination device configured to determine whether there exists the browsing time information satisfying a predetermined criterion for sending the page information to the at least one of the plurality of terminal apparatus, of the browsing time information stored in the browsing time information storage device; and a sending device configured to, when the page information determination device determines that there exists the browsing time information satisfying the predetermined criterion, send message data indicating that the page specified with the page information is displayed on the at least one of the plurality of terminal apparatus and page information of the browsing time information satisfying the predetermined criterion, to the at least one of the plurality of terminal apparatus connected to the teleconference, and each of the plurality of terminal apparatus including:

an instruction device configured to send the instruction to change the page of the display data being displayed in the individual display area;

a page change determination device configured to determine whether the page of the display data being displayed in the individual display area has been changed to another page by the instruction device;

an elapsed time determination device configured to determine whether a fifth predetermined time has elapsed, after the page change determination device determines that the page of the display data has been changed to another page;

a page information sending device configured to, when the elapsed time determination device determines that the fifth predetermined time has elapsed, send to the teleconferencing apparatus the page information of the display data being displayed in the individual display area;

a reception determination device configured to determine whether the message data sent by the sending device of the teleconferencing apparatus and the page information have been received;

a first display control device configured to, when the reception determination device has determined that the message data and the page information have been received, cause the display area to display the received message data; and a second display control device that configured to cause the shared display area to display a page of the display data specified with the received page information, after a sixth predetermined time has elapsed, since the message data has been displayed in the display area by the first display control device.

7. A method of controlling a teleconferencing apparatus which controls a teleconference to be performed between a plurality of terminal apparatus, each of the plurality of terminal apparatus having a display area, the display area including a shared display area and an individual display area, the method comprising:

a page information reception determination step of determining whether page information as information for identifying a page of display data being displayed in the individual display area has been received;

a browsing page information storage control step of, when it is determined in the page information reception determination step that the page information has been received, storing identification information for identifying at least one of the plurality of terminal apparatus having sent the page information and the received page information, in association with each other as browsing page information;

a browsing time information storage step of storing, as browsing time information, the page information of the display data displayed in the individual display area and a display time indicating a time in which a page specified with the page information being displayed in the individual display area is different from a page being displayed in the shared display area, in association with each other for each piece of the identification information;

a page information determination step of determining whether there exists the browsing time information satisfying a predetermined criterion for sending the page information to the at least one of the plurality of terminal apparatus, of the browsing time information stored in the browsing time information storage step; and a sending step of, when it is determined in the page information determination step that there exists the browsing time information satisfying the predetermined criterion, sending message data indicating that the page specified with the page information is displayed on the at least one of the plurality of terminal apparatus and page information of the browsing time information satisfying the predetermined criterion, to the at least one of the plurality of terminal apparatus connected to the teleconference.

8. A non-transitory computer-readable medium storing a control program for controlling a teleconferencing apparatus which controls a teleconference to be performed between a plurality of terminal apparatus, each of the plurality of terminal apparatus having a display area, the display area including a shared display area and an individual display area, the control program including instructions for executing a method to be executed by a computer of the teleconferencing apparatus, the method comprising:

a page information reception determination step of determining whether page information as information for identifying a page of display data being displayed in the individual display area has been received;

a browsing page information storage control step of, when it is determined in the page information reception determination step that the page information has been received, storing identification information for identifying at least one of the plurality of terminal apparatus having sent the page information and the received page information, in association with each other as browsing page information;

a browsing time information storage step of storing, as browsing time information, the page information of the display data displayed in the individual display area and a display time indicating a time in which a page specified with the page information being displayed in the individual display area is different from a page being displayed in the shared display area, in association with each other for each piece of the identification information;

a page information determination step of determining whether there exists the browsing time information satisfying a predetermined criterion for sending the page information to the at least one of the plurality of terminal apparatus, of the browsing time information stored in the browsing time information storage step; and a sending step of, when it is determined in the page information determination step that there exists the browsing time information satisfying the predetermined criterion, sending message data indicating that the page specified with the page information is displayed on the at least one of the plurality of terminal apparatus and page information of the browsing time information satisfying the predetermined criterion, to the at least one of the plurality of terminal apparatus connected to the teleconference.

* * * * *